US012632430B2

(12) United States Patent
Lee et al.

(10) Patent No.: US 12,632,430 B2
(45) Date of Patent: May 19, 2026

(54) WHAT IF SCENARIO PLANNING—MERGING A SCENARIO

(71) Applicant: Workday, Inc., Pleasanton, CA (US)

(72) Inventors: Darren Lee, Sunnyvale, CA (US); Srinivas Vemuri, Santa Clara, CA (US); Francis Wang, Foster City, CA (US); Christof Bornhoevd, Belmont, CA (US); Mark Thompson, Las Vegas, NV (US)

(73) Assignee: Workday, Inc., Pleasanton, CA (US)

( * ) Notice: Subject to any disclaimer, the term of this patent is extended or adjusted under 35 U.S.C. 154(b) by 107 days.

(21) Appl. No.: 18/594,720

(22) Filed: Mar. 4, 2024

(65) Prior Publication Data

US 2025/0103569 A1      Mar. 27, 2025

Related U.S. Application Data

(60) Provisional application No. 63/539,969, filed on Sep. 22, 2023.

(51) Int. Cl.
*G06F 16/21*          (2019.01)
*G06F 16/22*          (2019.01)
*G06F 16/28*          (2019.01)

(52) U.S. Cl.
CPC ........ *G06F 16/219* (2019.01); *G06F 16/2264* (2019.01); *G06F 16/283* (2019.01)

(58) Field of Classification Search
CPC ... G06F 16/219; G06F 16/2264; G06F 16/283
See application file for complete search history.

(56) References Cited

U.S. PATENT DOCUMENTS

| | | | | |
|---|---|---|---|---|
| 5,963,746 | A | * 10/1999 | Barker | ............... G06F 15/8007 |
| | | | | 712/E9.071 |
| 8,768,977 | B2 | 7/2014 | Golab | |
| 9,075,695 | B2 | 7/2015 | Pei | |
| 9,507,843 | B1 | 11/2016 | Madhavarapu | |
| 9,547,659 | B1 | 1/2017 | Barber | |
| 9,619,148 | B2 | 4/2017 | Bowman | |
| 9,830,366 | B2 | 11/2017 | Wagner | |
| 10,346,434 | B1 | 7/2019 | Morkel | |
| 10,896,205 | B2 | 1/2021 | Krishna | |
| 10,909,178 | B2 * | 2/2021 | Shore | .................. G06F 16/9024 |
| 11,281,696 | B1 | 3/2022 | Nguyen | |
| 11,328,106 | B2 | 5/2022 | Lekivetz | |
| 11,514,080 | B1 | 11/2022 | Angius | |
| 11,636,240 | B2 | 4/2023 | Skripkin | |
| 11,789,977 | B1 | 10/2023 | Mehta | |
| 11,900,152 | B1 | 2/2024 | Brooker | |
| 2008/0256099 | A1 * | 10/2008 | Chodorov | .............. G06Q 10/10 |
| 2009/0018996 | A1 * | 1/2009 | Hunt | ..................... G06Q 30/02 |

(Continued)

FOREIGN PATENT DOCUMENTS

WO          2022091203          5/2022

*Primary Examiner* — Merilyn P Nguyen
(74) *Attorney, Agent, or Firm* — Van Pelt, Yi & James LLP

(57) ABSTRACT

A system, method, and device for storing a scenario version as a base version for a hypercube are provided. The method includes (i) obtaining a request to store a scenario version of a hypercube as a base version; (ii) obtaining a set of transactions corresponding to hypercube updates for the scenario version, and (iii) writing the set of transactions to the base version.

27 Claims, 23 Drawing Sheets

(56)                    References Cited

U.S. PATENT DOCUMENTS

| | | | |
|---|---|---|---|
| 2010/0235345 A1 | 9/2010 | Joseph | |
| 2010/0250566 A1* | 9/2010 | Paul | G06F 16/283 |
| | | | 707/756 |
| 2011/0041089 A1 | 2/2011 | Lam | |
| 2013/0227542 A1 | 8/2013 | Pei | |
| 2014/0324768 A1 | 10/2014 | Cappiello | |
| 2016/0103903 A1* | 4/2016 | Vivalda | H04L 65/403 |
| | | | 709/204 |
| 2017/0177636 A1* | 6/2017 | Nguyen | G06F 16/2264 |
| 2018/0081879 A1 | 3/2018 | Lontchar | |
| 2018/0150493 A1 | 5/2018 | Wolgé | |
| 2019/0179918 A1 | 6/2019 | Singh | |
| 2019/0197021 A1 | 6/2019 | Bowman | |
| 2019/0311057 A1 | 10/2019 | Sung | |
| 2019/0332610 A1* | 10/2019 | Krishna | G06F 16/2457 |
| 2021/0217093 A1* | 7/2021 | Fani | G06Q 30/012 |
| 2021/0234884 A1* | 7/2021 | Brown | H04L 63/1433 |
| 2022/0012254 A1 | 1/2022 | White | |
| 2022/0164369 A1* | 5/2022 | Nguyen | G06F 9/3838 |

* cited by examiner

585

555

ValArray C (formula C = A + B)

Location: Account, OrgLevel, Region, etc.

Snapshot Chain Info

560

Scenario Override Chain

Base Chain Info

Override Chain:
0: null
1: null

Override Bits: 10

565

Snapshot (T_A,INF)

Values: [11, 11, 11, 11]

650

655

ValArray C (formula C = A + B)

Location: Account, OrgLevel, Region, etc.

Snapshot Chain Info

660

Scenario Override Chain

Base Chain Info

Override Chain:
0: null
1: null

Override Bits: 11

665

Snapshot (T_A,INF)

Values: [11, 11, 11, 11]

800

900

1000

1100

WHAT IF SCENARIO PLANNING—MERGING A SCENARIO

CROSS REFERENCE TO OTHER APPLICATIONS

This application claims priority to U.S. Provisional Patent Application No. 63/539,969 entitled WHAT IF SCENARIO PLANNING filed Sep. 22, 2023 which is incorporated herein by reference for all purposes.

BACKGROUND OF THE INVENTION

Query evaluation systems, which capture and model future outcomes, are typically built based on multi-dimensional databases, usually called hypercubes to facilitate analysis. Data in a hypercube is associated with a coordinate tuple, having a value in each of a set of defined dimensions. Dimensions used in planning are usually hierarchical in nature. Dimensions can have attributes which are also often hierarchical. Parent elements represent the rollup, or aggregation, of all of the elements "beneath" them in the hierarchy. Some of these hierarchies can be quite high and/or wide (a single parent may represent a rollup of thousands or even millions of children). Query evaluation systems have long had challenges dealing with large and complex models, especially when the amount of data in hypercubes is increasing.

Systems are generally constrained with respect to storing data obtained in connection with evaluating planning models, such as for analyzing data in the hypercube that changes over time. It requires substantial memory resources to copy an entire hypercube as data changes over time. This is a problem as processes need to have data consistency from the hypercube during the time they are running.

BRIEF DESCRIPTION OF THE DRAWINGS

Various embodiments of the invention are disclosed in the following detailed description and the accompanying drawings.

DETAILED DESCRIPTION

Figure 1:
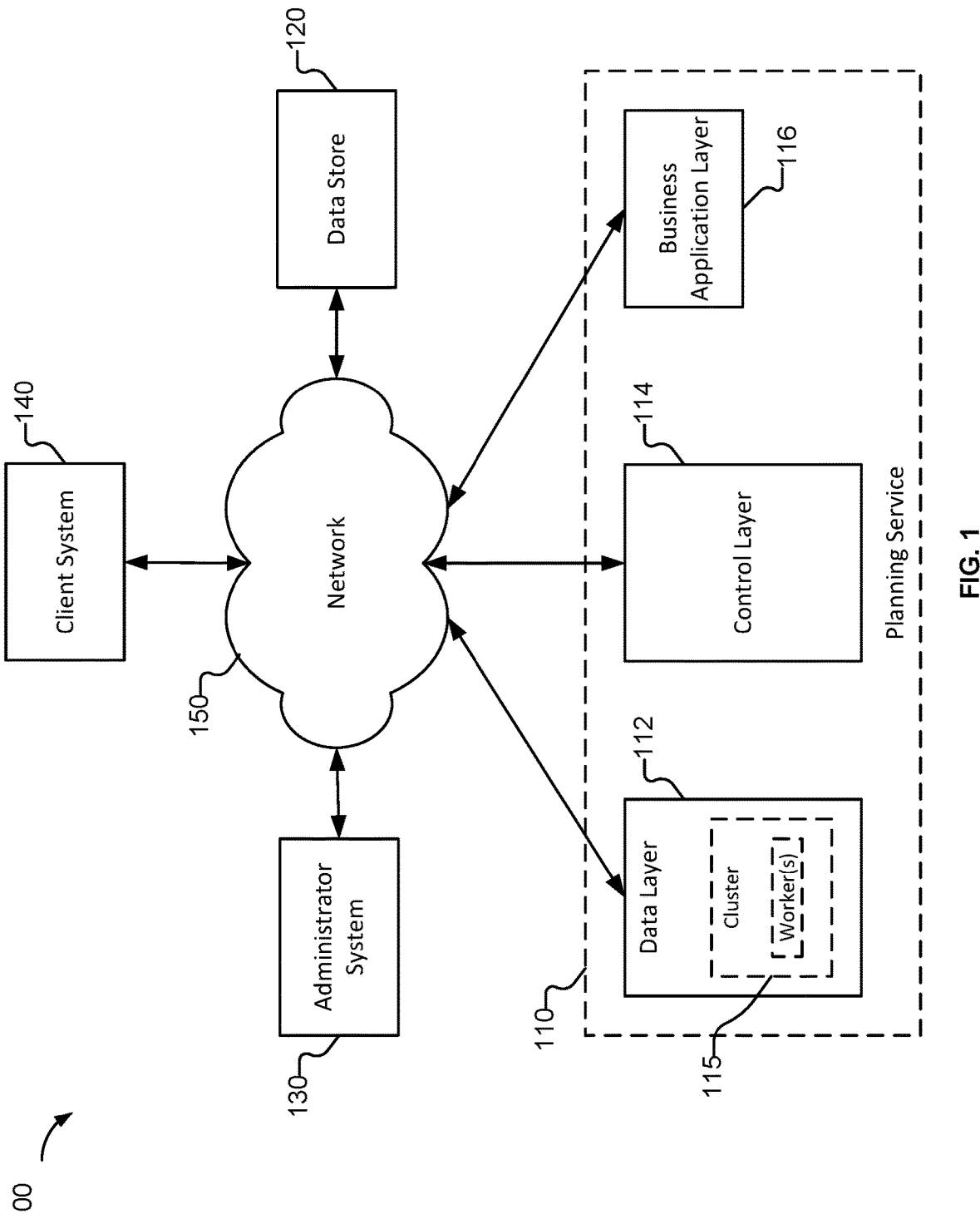
FIG. 1 is a block diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a hypercube may mean an N×M×Z dimensional logical construct in which data for a dataset may be stored. As an example, each cell in the hypercube corresponds to a location at which data may be stored. N, M, and Z are positive integers. In various embodiments, the hypercube has 3, 4, 5, 6, 7, or K dimensions, where K is an integer.

As used herein, a tuple may refer to a collection of values that represent a specific point or vertex in the hypercube. For example, each dimension in a hypercube corresponds to an axis, and each axis can take on a range of values. A tuple in such a context may include values, one for each dimension that specifies a location or vertex within the hypercube. The hypercube may specify a unique point within the hypercube. Tuples are a useful way for describing a navigating point in multidimensional spaces, which can be challenging to visualize.

As used herein, accounts may refer to a built-in dimension that allows a user to categorize numeric data in a hypercube by common or meaningful categories (e.g., business categories, such as revenue, assets, income, etc.). Accounts can have a recursive structure, such as a formula that depends on two values, which themselves may be results of evaluating other formulas. For example, if an account F may be denoted by F=F1+F2, where F1=A+B and F2=C, where A, B and C are data-entry/leaf accounts whereas F, F1 and F2 are formula accounts. In this example, evaluation of F has a natural recursive structure which involves the evaluation of F1 and F2 at the first level of recursion and the evaluation of A, B, C at the leaf/last level of evaluation.

As used herein, a reading process is a process that accesses a value in the hypercube (e.g., a value in cached version/snapshot) or an account derived from values in the hypercube.

As datasets are used by organizations at scale, planning models are developed to predict future values for points in the hypercube or accounts that are derived from values in the hypercube. For example, a planning model predicts the future values based on some known numeric inputs and formulas that try to predict future values.

More sophisticated planning models are developed across a plurality of dimensions. The dimensions may be common across various organizations or organization-specific/defined. Dimensions are part of the metadata and can include many different types of entities on which the data is categorized. Examples of dimensions include Region, Product, Job Title. Dimensions can form a natural hierarchy—for example, a dimension along location can form a hierarchy such as North America→United States→US-West→San Francisco, or North America→Canada→Ontario→Toronto. In this case, the arrows denote a parent child relationship. A dimension value higher up in the hierarchy (e.g., North America or United States in the example above) is referred to as a rollup dimension.

In multidimensional planning, input values are tagged with relevant values in a particular dimension. Data can be aggregated and filtered by different dimension values to gain insight into a particular aspect of a customer's business (e.g., sales can be filtered by a particular product). Organizations often deploy continuous planning (also referred to as rolling planning) according to which the plan/forecast is updated regularly (e.g., according to a predetermined frequency or time period). The previous state of a plan is an important artifact because the organization may want to compare the previous state of the forecast against the current state of the forecast, such as to gain insight on how their opinion of the business is changing. Accordingly, persisting the previous state, at least until it is no longer needed, is beneficial.

Persisting different states of the plans generally includes storing versions of the plans. Versions typically store copies of all numeric inputs, (version specific) formulas, assumptions, and driver values, etc. Structural elements that may be global to all versions are generally not stored in each version redundantly. The version can be created by a cloning of an existing version and assigning a name/unique version identifier. The cloning operation copies all (or substantially all) the data (facts, assumptions, drivers) and is a heavyweight operation (e.g., performing the cloning operation is resource intensive) due to the amount of data that is created. A new version created from an existing version, such as a prototype version, is no longer linked to such version from which the new version is created. For example, the prototype version and the new version can change independently of each other. All created versions are thus independent of each other.

Systems can store versions in cache and use the versions as a source of data in memory that can be rapidly retrieved, such as to compute an account at a particular location. When an account is evaluated, the system may cache the result in the version cache to save future re-evaluation.

A particular hypercube version may change over time. Accordingly, persisting versions may comprise to capturing snapshots of the various versions (e.g., a base version and/or a set of scenario versions) at various times, such as when the particular version has been updated or a particular location in the particular version has been evaluated. The persisting of versions assists with ensuring time consistency such as a potentially long-running report that needs to have all of its values (e.g., data entry/input values, and calculated values, etc.) consistent with respect to the start time of the report. For example, if the values of input accounts A and B were 10 and 20, respectively, and if a report involved the calculation of Input accounts A, B and calculated account C with formula C=A+B, and the report started at time 6:00 PM, ran for 10 minutes, but input account A got modified to 40 at time 6:05 PM, a read consistent evaluation will see A=10, B=20, C=30. Any of the following alternatives are unacceptable from a read consistency point of view A=10, B=20, C=60 (e.g., the updated value of A was observed when evaluating C); and A=40, B=20, C=60 (e.g., the updated value of A was observed when evaluating A and C).

Related art systems can ensure read consistency via use of read and write locks on the version cache. Read locks are acquired by readers when the reading process queries/accesses data in the version, and the acquisition of this read lock blocks any writers on the same version cache. However, at any one time, many reading processes can be running concurrently. Similarly, writing processes can obtain write locks. The acquisition of the write lock itself blocks until any active concurrent reading processes exit the version cache, and once acquired, the write lock blocks new reading processes from entering the version cache. Ensuring read consistency according to such a method creates scalability bottle necks because writer processes may suffer long latency spikes when there is a persistent influx of reading processes in the system due to having to wait for potentially expensive and long running read sessions to finish.

According to various embodiments, the system implements a multiversion concurrency control that is finer than version control employed by related art systems, such as by avoiding making full copies of a version cache. Further, the system implements the multiversion concurrency control in a more efficient manner, including by referring to values from base versions for use in connection with scenario versions for the same hypercube and thus taking advantage of not having to store the same values in both the base version and the scenario version when they are loaded into memory.

In addition to using hypercube versioning to enable the development and use of different scenarios, the system also uses versioning on a value object level. For example, a hypercube may have corresponding data structures (e.g., an anchor object) associated with locations in the hypercube. The data structures may capture versioning of the values at a corresponding hypercube location for the various different hypercube versions associated with the hypercube. For example, the system may store the various base version values over time and the various scenario version values as they are created or edited over time. In some embodiments, the system performs, for a particular version-level, snapshotting of value objects that comprise data for a location in the hypercube or data derived from evaluating an account (e.g., value objects that reference user-entered values). The system can perform snapshotting on values that change over time, which are usually either user entered values on an input account or derived numeric values of a formula account. For example, the system performs snapshotting to capture base version snapshots that can be used to form a base snapshot chain representing the various base version values at that particular location over time. The base version snapshots or base snapshot chains may be pointed to by the data structure for that location. Similarly, the system performs snapshotting to capture scenario version snapshots for the various scenario versions associated with the hypercube. The system creates a set of scenario snapshot chains respectively corresponding to scenario versions associated with the hypercube.

In some embodiments, the system stores for a particular hypercube version a snapshot chain for a set of snapshots associated with a particular value object (e.g., a set of snapshots for a particular location in the hypercube). For example, the system stores a base snapshot chain for the base version and/or a scenario snapshot chain for a corresponding scenario version. The snapshot chain may correspond to an index for a set of snapshots associated with a particular value object for the particular hypercube version. The set of snapshots associated with the particular value object (e.g., particular location of the hypercube) effectively form a history of changes on a such value object of that hypercube version spanning from the creation time of the object.

In some embodiments, the system obtains requests to edit or update a particular location of a particular hypercube version. If the user or system/service requesting the edit or update has appropriate permissions, the system performs the edit/update operation for the particular location of a particular hypercube version. Additionally, in some embodiments, the system propagates the edit/update to other locations and/or other hypercube versions. The system can determine the other locations of the particular hypercube version or locations in a different hypercube version that depends on the value at the particular location being updated/edited. In response to determining the hypercube locations/versions having a dependency on the particular location being updated, the system can propagate the change, such as to set an indicator for the dependent locations that indicates that the value at the particular location for the particular hypercube version has changed and that a value determined based on the dependency for the dependent location is thus invalid. Additionally, or alternatively, the system may cause a reading process to re-evaluate the value for the dependent locations/versions.

In some embodiments, the system stores a data structure (e.g., an anchor object) associated with a value object for a particular location. For example, the value object may itself comprise the anchor object. The anchor object comprises one or more of snapshot information, version information, override information, and/or any other appropriate information. The anchor object may use the snapshot information and the version information to index the snapshots for the value object (e.g., the particular location), such as in the form of a snapshot chain.

The anchor object stores pointers to snapshots and validity periods for the snapshots. The anchor object may store a mapping of snapshot chains to hypercube versions. For example, the anchor object comprises a pointer to a base snapshot chain and one or more pointers to the various scenario snapshot chains respectively associated with a set of scenario versions for the hypercube.

The anchor object may additionally store override data that indicates whether any of the scenario versions have scenario override values that are to override (e.g., for the applicable scenario version) the value of the base version at the particular location. For example, the anchor object stores an override bit string with each bit corresponding to a different scenario version and having a value that is indicative of whether the corresponding scenario version has a scenario override value.

In some embodiments, the system receives a request to set a scenario version as the base version (e.g., to merge the scenario version with the base version). As an example, the system sets the scenario version as the base version by obtaining (e.g., from a transaction log) a set of transactions performed on the scenario version (e.g., the edits for the incremental change between the scenario version and the base version) and re-write the set of transactions on the base version. The system can further implement one or more rules in connection with resolving conflicts between edits made to the base version and edits made to the scenario version as of the time when the merge is requested. In connection with re-writing the set of transactions to the base version, the system additionally propagates the changes to other locations or hypercube versions having dependencies on the locations of the base version being edited. In some embodiments, setting a scenario version as the base version can be viewed as the scenario version becoming the base version in that the scenario inherits all its values from the base minus the overridden values, and the merging of the scenario copies the overridden values to the base.

In various embodiments a system, method, and device for managing dependencies between a hypercube base version and a set of scenario versions for the hypercube is provided. The method includes (i) obtaining a request for a version of a hypercube, and (ii) in response to obtaining the request: (a) obtaining a base version of the hypercube, (b) obtaining an override data structure that indicates a set of scenario values that override corresponding base version values, and (c) providing the version of the hypercube based at least in part on the base version and the override data structure.

In various embodiments a system, method, and device for updating a base version of a hypercube is provided. The method includes (i) obtaining a request for a planning session with respect to a hypercube; and (ii) in response to obtaining the request: (a) determining that the planning session uses a base version of the hypercube, (b) receiving a value input to update a particular location in the hypercube, (c) storing the value for the particular location in the base version of the hypercube, and (d) propagating an update to the particular location of the base version of the hypercube to one or more scenario versions having a dependency on the base version.

In various embodiments a system, method, and device for storing a scenario version as a base version for a hypercube is provided. The method includes (i) obtaining a request to store a scenario version of a hypercube as a base version; (ii) obtaining a set of transactions corresponding to hypercube updates for the scenario version, and (iii) writing the set of transactions to the base version.

In some embodiments, the system improves the computer by making reading and writing processes more efficient. In particular, by enabling localized version storage using anchor objects and snapshot chains, the system efficiently stores values associated with hypercube locations (including locations that have formulas) that are necessary for active read processes without the storage overhead of making complete copies of the entire hypercube. Further storage efficiency is achieved by removing the stored snapshots that are no longer required by active read processes. In some embodiments, the system improves efficiency associated with tuple changes (e.g., groups of tuples such as rows or columns) in a similar manner.

Additionally, in some embodiments, the system improves the computer by more efficiently using memory resources to load a plurality of versions of a hypercube into memory at the same time. Efficiency is achieved by loading a base version and loading one or more scenario versions, which store values/formulae at locations of the hypercube that are to override the base version values but otherwise using the values of the base version loaded into memory for locations where the scenario versions do not store values that are to override the base version.

FIG. 1 is a block diagram of a network system according to various embodiments of the present application. In some embodiments, system 100 implements one or more of processes 700-1600 of FIGS. 7-16. System 100 may be implemented at least in part by system 200 of FIG. 2.

In the example illustrated in FIG. 1, system 100 includes planning service 110, administrator system 130 and/or client system 140. System 100 may additionally include one or more data stores, such as data store 120, and network 150 over which one or more of planning service 110, client system 140, administrator system 130, and data store 120 are connected. In some embodiments, planning service 110 is implemented by a plurality of servers. In various embodiments, network 150 includes one or more of a wired network and/or a wireless network such as a cellular network, a wireless local area network (WLAN), or any other appropriate network. System 100 may include various other systems or terminals.

In some embodiments, planning service 110 is configured to: (a) receive a request to load a hypercube version; (b) determine (e.g., based on a context version identifier associated with the request) whether the hypercube version corresponding to the request is a base version or scenario version; (c) determine whether the base version and/or scenario version is already loaded in memory, (d) load the base version and/or scenario version if the requested scenario version is not already in memory, (e) receive an edit/update to the requested hypercube version; (f) perform an edit to the hypercube version, (g) determine whether to propagate the edit/update to other locations in the hypercube version or to locations in other scenario versions (e.g., based on dependencies across locations and/or hypercube versions), and/or (h) propagate the edit/update to the other locations in the hypercube version or to the locations in other scenario versions.

Planning service 110 may further be configured to: (a) receive a request to merge a scenario version to a base version; and (b) in response to receiving the request to merge the scenario version to a base version, performing the merge of the scenario version. Performing the merge of the scenario version includes resolving any conflicts between edits made to the base version and edits made to the scenario version being merged to the base version.

Planning service 110 may also be configured to: (a) obtain a query that is indicative of one or more properties of result data, (b) determine, based at least in part on the query, one or more partitions of a hypercube that are expected to comprise information used in generating result data for a response for the query, (c) determine corresponding snapshots (e.g., the applicable base version snapshot or scenario version snapshot) to be used in responding to the query, (e) provide the snapshot or evaluate the query using the snapshot, and (f) return a result for the query. The query may correspond to a request from a reading process for a particular location of the hypercube or other value object. For example, planning service 110 receives a request for a reading process to access a value at a particular location in the hypercube or other value object. The reading process may be a process running on planning service 110, such as by data layer 112, to evaluate a query or evaluate a plan.

In connection with accessing a value at a particular location, planning service 110 may determine whether to use the base version value or a scenario version value (e.g., if the query or corresponding reading process is associated with a particular scenario version) as an override value. If planning service 110 determines that the particular location (for the applicable hypercube version) comprises a formula, planning service 110 may determine whether system 100 already stores a valid evaluation result for the formula. In response to determining that no valid evaluation result is stored for the formula, planning service evaluates the formula, including obtaining the values from other hypercube locations or hypercube versions on which the formula depends. In response to determining that a valid evaluation result is already stored for the formula, planning service 110 obtains the valid evaluation result as the value at the particular location.

In response to receiving the query, planning service 110 determines the snapshot responsive to the query based on metadata associated with the reading process from which the query is received. The metadata may include a timestamp (e.g., a transaction time) associated with the reading process, such as a start time at which the reading process was invoked. As an example, planning service 110 (e.g., control layer 114 of planning service 110) determines the snapshot responsive to the query based on determining a snapshot having a validity period with which the timestamp associated with the reading process intersects. The system is effectively using transaction time (i.e., commit time of the most recent transaction prior to the start of the query) as the query read time. The metadata may further include context version information (e.g., a context version identifier) that identifies the particular hypercube version with which the reading process is associated. Planning service 110 uses the context version information to determine the appropriate snapshot chain from which to obtain the snapshot responsive to the query.

In various embodiments, planning service 110 processes workloads, such as at scale for big data evaluations across hypercubes such as datasets that are sparsely populated (e.g., datasets having significantly large dimensionality). Planning service 110 may evaluate planning to determine forecasts with respect to data in the hypercube. Planning service 110 is configured to receive one or more queries (e.g., business logic to be executed) from another system, such as client system 140. In response to receiving the one or more queries, planning service 110 (e.g., control layer 114 of planning service 110) determines one or more datasets storing data for which the other system is seeking to evaluate. In response to determining the dataset(s), planning service 110 obtains business logic (e.g., logic for a plan to be run) to be executed (e.g., in connection with evaluating/analyzing the data).

In some embodiments, planning service 110 comprises data layer 112, control layer 114, and/or business application layer 116. Data layer 112, control layer 114, and/or business application layer 116 are respectively implemented by one or more servers. In some embodiments, data layer 112 comprises one or more clusters of compute resources (e.g., virtual machines).

Data layer 112 obtains a query received by planning service 110 and processes the query to provide result data, such as in the form of a report (e.g., a forecast generated by executing a planning model). Data layer 112 receives the query, divides the query into a set of requests, processes at least a subset of the set of requests in parallel, and generates result data that is responsive to the query based on results for the set of requests. The system may create a reading process and/or writing process for each request to be processed. For example, the set of requests may correspond to requests to obtain a value at a particular location in the hypercube or for a particular account. Obtaining the value may include determining that the particular location or account comprises a formula that is to be evaluated to return the result and causing the formula to be evaluated. As an example, the set of requests comprises requests (e.g., subqueries) that are independent (e.g., the various requests do not have cross dependencies). Each request may correspond to one or more account groups.

In some embodiments, data layer 112 comprises a version loading engine, a version update engine, an update propagation engine, a query engine, an execution engine, a formula evaluator, snapshotting engine, cleanup engine, and/or a merging engine. The query engine, the execution engine, the formula evaluator, and/or the snapshotting engine may be executed by cluster 115 of compute resources.

The version loading engine is a service that loads the appropriate hypercube version(s) in memory in response to a request for a planning session. The version loading engine determines the hypercube version to load based on a context version identifier associated with the request for the planning session. If the version loading engine determines that the hypercube version to be loaded is the base version, the version loading engine causes the base version to be loaded in memory if it is not already loaded. Conversely, if the version loading engine determines that the hypercube version to be loaded is the scenario version, the version loading engine ensures that the base version is loaded before loading the scenario version (if the scenario version is not already loaded).

The version update engine is a service that receives edits/updates, such as from a user during the planning session, and stores the updates in the appropriate hypercube location and hypercube version. The version update engine invalidates a then-currently valid snapshot at the hypercube location (e.g., sets the end time of the then currently valid snapshot to the time at which the edit is made). The version update engine may also capture a new snapshot to serve as the new current snapshot.

The update propagation engine is a service that propagates the edits/updates to other hypercube locations in the same hypercube version or different hypercube version having a dependency on the hypercube location to which the edit is made. For example, if the edit is made to a base version, the edit is propagated to a scenario version having a dependency on the hypercube location to which the edit is made. The update propagation engine determines the dependencies and sets appropriate flags to the dependent locations that indicate that the value has changed and the value at the dependent location needs to be re-evaluated. The update propagation engine can also invalidate snapshots at the dependent locations.

The query engine (e.g., an interpretive engine) is a service that receives a query, pre-processes the query, and divides the query into a set of requests (e.g., independent subqueries), such as tasks to be run by reading processes to access values in a particular location or account. The query engine may aggregate results obtained from the execution engine, which may use a set of reading processes to access data at the various locations or accounts for the hypercube.

The query engine analyzes the query to determine roll up elements, identify roll up elements that overlap, and remove the overlapping elements to ensure each element is only computed once. The query engine uses the dependency of data to determine subqueries and to schedule some subqueries to run in parallel. The unit of parallelization of the subqueries may be based on the dimension of the account being analyzed.

In response to determining the set of requests, the query engine generates a set of tasks respectively corresponding to the set of requests. The query engine submits the tasks for evaluation. For example, the query engine causes the tasks to be submitted to the execution engine for execution. In some implementations, the parallelization of the set of requests is determined by the query engine. In other implementations, the parallelization of the set of requests may be determined/managed by the execution engine.

The execution engine is a service that executes the query, such as by executing the set of requests associated with the tasks submitted by the query engine. The execution engine evaluates each request of the set of requests and aggregates the data to obtain a response to the query (e.g., in accordance with the definition of the normalized query obtained by the query engine).

In some embodiments, the execution engine starts reading processes and/or writing processes in connection with reading or manipulating data at a particular location hypercube or account. For example, the execution engine instantiates a reading process to obtain a value at a particular location in the hypercube or a particular account.

The execution engine (e.g., an engine that is executing one or more reading processes) identifies a hypercube location from which to obtain a value and determines the appropriate value (e.g., the value in a base version snapshot or a value in an applicable scenario version snapshot) based at least in part on the context version associated with the reading process (e.g., the hypercube version for which the reading process is executing the query). The execution engine can determine the appropriate value based on querying a data structure (e.g., an anchor object) associated with a value object for the particular hypercube location. For example, the execution engine queries the override data stored in the data structure, which indicates locations of the snapshots (e.g., stores pointers to the snapshot(s)) and whether a particular scenario version has a scenario override value for the particular hypercube location.

The formula evaluator is a service for resolving a formula, such as an arithmetic expression, with respect to identified cells or accounts in the data structure (e.g., the dimensional space for a query). In connection with evaluating the formula, the system uses values obtained from reading processes executed by execution engine and obtains a resulting value.

The snapshotting engine is a service for snapshotting versioning of value objects, such as an object corresponding to a particular location in the hypercube or a particular account. Planning service 110 uses the snapshotting engine to capture snapshots of a value object and store the snapshots in a snapshot dataset, such as a dataset stored in data store 120. The snapshotting engine may be further configured to update an anchor object based on the capturing of the snapshot, such as to update an index of snapshots for the value object to include the newly captured snapshot. In connection with updating the anchor object, the snapshotting engine stores snapshot information (e.g., a pointer to the corresponding snapshot stored in the snapshot dataset) and version information (e.g., a validity period, such as a start time and/or end time). The snapshotting engine may capture the snapshot of the value object in response to (i) determining that the value for the value object has been updated/ modified, and/or (ii) determining that a request from a reading process for the value of the value object is received and determining that no current snapshots for the value object are valid for the reading process.

Planning service 110 may further use the snapshotting engine to manage the validity of snapshots, such as by monitoring when a change is made to the hypercube or an account (e.g., a value is updated) and determining whether such change impacts a current snapshot (e.g., whether the change would cause a snapshot to no longer be current or otherwise cause the snapshot to be invalidated). The snapshotting engine may update the anchor objects for a value object that is changed to update the validity period of a snapshot that is rendered invalid from the change to the value object.

The cleanup engine is a service for performing cleanup operations with respect to snapshots. The cleanup engine is used to purge snapshots that are no longer required by any current reading processes. For example, for a particular value object (and corresponding anchor object), the cleanup engine identifies a set of active reading processes, determines an earliest reading process of the set of active reading process, and determines any snapshots that have validity periods ending before a timestamp associated with the earliest reading process. The cleanup engine determines to delete the snapshots having validity periods that end before the timestamp associated with the earliest reading process. In some embodiments, the cleanup engine is invoked (e.g., caused to run the cleanup operation) in response to determining that an amount of available memory is less than a predefined memory threshold or in response to a predetermined amount of time having lapsed since a last iteration of the cleanup operation was performed.

The merging engine is a service that merges a scenario version to the base version (e.g., to set the scenario version as the base version). In response to receiving a request (e.g., from a user, such as during a planning session) to set the scenario version as the base version, the merging engine configures the scenario version as the base version. For example, the merging engine obtains from a transaction log a set of transactions/edits made to the scenario version (e.g., the incremental difference between the scenario version and the base version) and re-writes the set of transactions/edits to the base version (e.g., if the user requesting the merge has the appropriate permissions to write such transactions to the base version). In connection with merging the scenario version to the base version, the merging engine resolves any conflicts between edits made to the base version and edits made to the scenario version. Additionally, the merging engine can invoke the update propagation engine to propagate the changes to the base version (e.g., resulting from the merge of the scenario version) to other scenario versions that had a dependency on the base version.

Planning service 110 provides the result (e.g., responsive data) for the query to client system 140. For example, planning service 110 uses business application layer 116 to configure a user interface to display the results (e.g., provide a report or a sheet to client system 140), such as in the form of a report.

In some embodiments, data layer 112 manages a cluster of compute resources to execute the business logic of the query (e.g., to process the set of requests/subqueries against the applicable data). For example, data layer 112 establishes the connections between the set of compute resources and the data source(s) and allocates the workload for the business logic across the set of compute resources.

According to various embodiments, business application layer 116 provides an interface via which a user (e.g., using client system 140) may interact with various applications such as a development application for developing a service, application, and/or code, an application to access raw data (e.g., data stored in data store 120), an application to analyze data (e.g., log data), etc. Various other applications can be provided by business application layer 116. For example, a user queries data layer 112 by sending a query/request to business application layer 116, which interfaces with data layer 112 and/or data store 120 to obtain information responsive to the query (e.g., business application layer 116 formats the query according to the applicable syntax and sends the formatted query to data layer 112, such as via control layer 114). As another example, an administrator using administration system 130 uses an interface provided/configured by business application layer 116 to configure (e.g., define) one or more security policies including access permissions to information stored on data store 120, permissions to access performance profiles, etc.

Administrator system 130 comprises a system for use by an administrator. For example, administrator system 130 comprises a system for communication, data access, computation, etc. An administrator uses administrator system 130 to maintain and/or configure planning service 110 and/or one or more of data stores (e.g., data store 120). For example, an administrator uses administrator system 130 to start and/or stop services on planning service 110 and/or data store 120, to reboot data store 120, to install software on planning service 110 and/or data store 120, to add, modify, and/or remove data on data store 120, etc. Administrator system 130 communicates with planning service 110 and/or data store 120 via a web-interface. For example, administrator system 130 communicates with planning service 110 and/or data store 120 via a web-browser installed on administrator system 130. As an example, administrator system 130 communicates with planning service 110 and/or data store 120 via an application running on administrator system 130.

In various embodiments, an administrator (or other user associated with a tenant or entity with which the tenant is associated such as a customer) uses administrator system 130 to configure a service provided to a tenant (e.g., an instantiation for an organization associated with a particular hypercube or planning model). As an example, the administrator uses administrator system 130 to communicate with planning service 110 to configure the service provided to the tenant. For example, administrator system 130 may communicate with planning service 110 via business application layer 116. In some embodiments, business application layer 116 serves as a gateway via which the administrator may interface to manage, configure, etc. data layer 112, control layer 114, and/or business application layer 116. Administrator system 130 may configure one or more policies for planning service 110, such as one or more security policies and/or one or more compute resource policies, etc.

Data store 120 stores one or more datasets. In various embodiments, the one or more datasets comprise human resources data, financial data, organizational planning data, or any other appropriate data. In some embodiments, data store 120 stores one or more datasets for a plurality of tenants. For example, data store 120 hosts at least part of a software as a service (e.g., a database storing data for the service) for a plurality of tenants such as customers for a provider of the software as a service. In various embodiments, a tenant comprises an organization such as a company, a government entity, a sub-organization of an organization (e.g., a department), or any other appropriate organization. For example, data store 120 comprises one or more database systems for storing data in a table-based data structure, an object-based data structure, etc. In various embodiments, data store 120 comprises one or more of: a business database system, a human resources database system, a financial database system, a university database system, a medical database system, a manufacturing database system, or any other appropriate system. In some embodiments, data store 120 comprises one or more object-oriented database systems.

According to various embodiments, a user uses system 100 (e.g., a client or terminal, such as client system 140, that connects to planning service 110 via network 150) to define business logic and/or to execute such business logic with respect to data (e.g., one or more datasets) stored on data store 120. As an example, a user inputs to client system 140 one or more requests for a planning session to be communicated to planning service 110 for planning service 110 to load a planning session and enable the user to edit hypercube versions. As another example, a user inputs to client system 140 one or more queries to be run against a dataset. In response to receiving the business logic, planning service 110 uses data layer 112 (e.g., a cluster of compute resources) to execute the business logic (e.g., with respect to data stored by data store 120) and provides a result to the user (e.g., via a user interface provided on client system 140). In some embodiments, the result comprises information or a set of information that is responsive to the execution of the business logic. Planning service 110 may enforce one or more security policies with respect to the result, including restricting access to certain information to which the user associated with client system 140 does not have permissions or otherwise masking certain information. In some embodiments, the result comprises a report including information that is responsive to the execution of the business logic or selectable elements (e.g., links such as hyperlinks) that point to information that is responsive to the execution of the business logic. The result may be provided in a data frame, a report, a sheet, and/or any other form of data or data file.

In some embodiments, data layer 112, control layer 114, and/or business application layer 116 are implemented on a single server or a plurality of servers. For example, data layer 112 and business application layer 116 are different modules running on a same server or set of servers.

Figure 2:
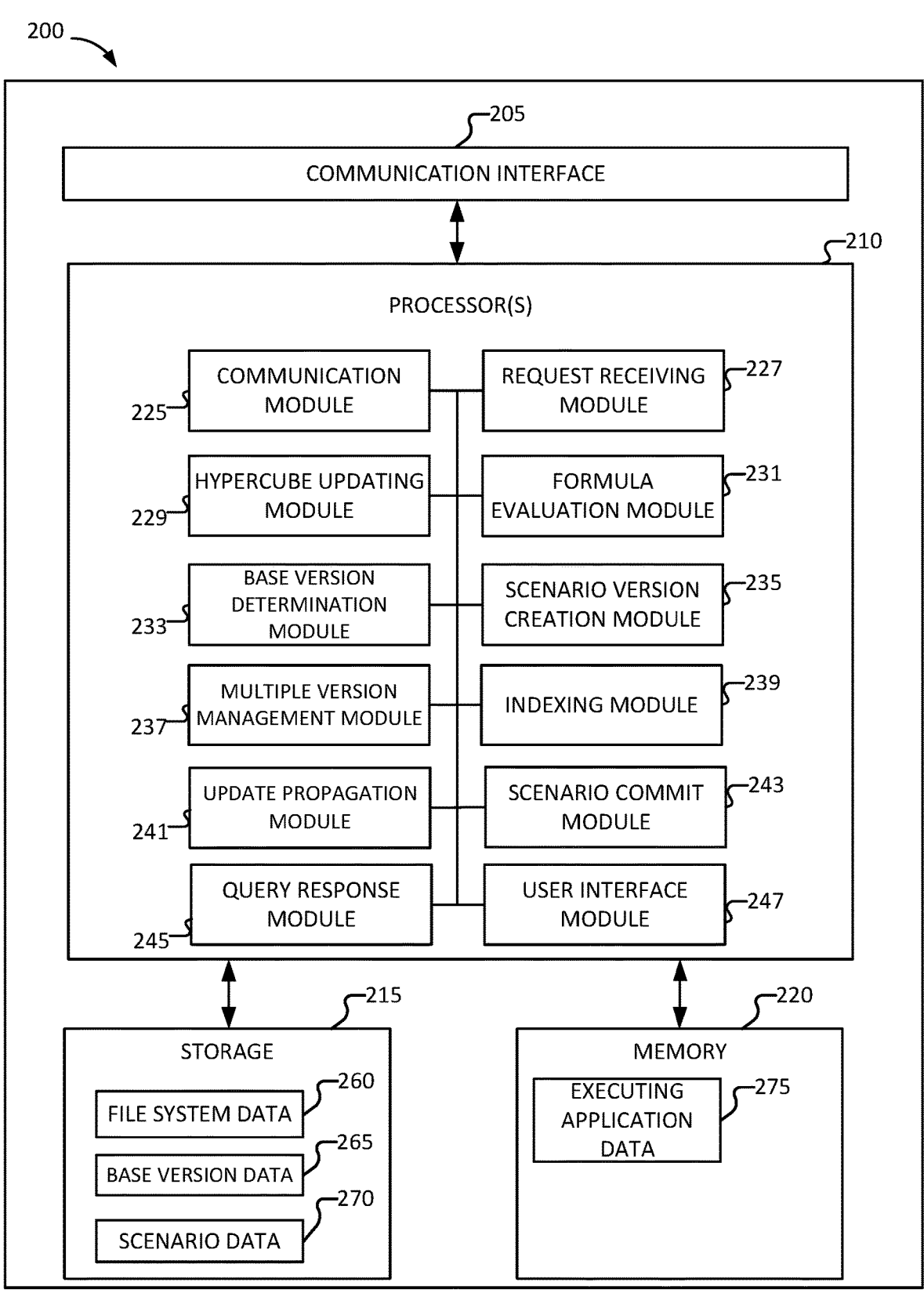
FIG. 2 is a block diagram of a system for providing planning session for evaluating data stored in a hypercube according to various embodiments of the present application.

FIG. 2 is a block diagram of a system for providing planning sessions for evaluating data stored in a hypercube according to various embodiments of the present application. In some embodiments, system 200 implements one or more of processes 700-1600 of FIGS. 7-16. In the example shown, system 200 may implement at least part of system 100 of FIG. 1, such as planning service 110 of system 100. According to various embodiments, system 200 corresponds to, or comprises, a system for configuring or maintaining a hypercube comprising a plurality of versions, including a base version and one or more scenario versions. The configuring of the hypercube includes configuring one or more data structures that indicate(s) the hypercube value to be returned to a reading process (e.g., a value based on a reading process time and/or an indication of the context version such as an indication of the version for which the value is being obtained). The system may configure additional scenario versions for the hypercube and maintain the data structure(s) to include the additional scenario versions.

Additionally, system 200 may correspond to, or comprise, a system that is configured to process a query against a sparsely populated hypercube, including receiving logic for a query, determining a set of locations in the hypercube at which data is expected to be stored, generating a set of calls (e.g., requests) based at least in part on the set of locations, communicating the set of calls to a service (e.g., a planning service) that will query the hypercube based on the dataset, obtaining the resulting data from the set of locations, and processing the data to obtain a result for the query.

In some embodiments, system 200 maintains/manages a set of snapshots for value objects of particular locations in a hypercube and/or particular accounts. System 200 captures snapshots of the value objects based at least in part on determining that a value for the value object has changed. For example, system 200 stores a set of one or more snapshots associated with a value object that form a versioning history of the value object. In response to receiving queries, system 200 determines the applicable snapshot of a value object to obtain for a reading process that is invoked during execution of the query. System 200 maintains/manages the set of snapshots for a plurality of hypercube versions, including a base version and a set of one or more scenario versions. System 200 can configure one or more data structures associated with the hypercube (e.g., a data structure for a particular location of the hypercube) to comprise the snapshots or pointers to the snapshots and other information from which a reading process can determine the applicable snapshot or value to be used for a query (e.g., a value to be used for the particular location for which the reading process is accessing the hypercube).

In some embodiments, system 200 provides a planning service that enables users or other systems to query against the hypercube for various different versions of the hypercube. System 200 can instantiate a planning session for a particular query or request for the planning service. The planning session may be associated with a context version that indicates the particular hypercube to be used for the planning session. For example, the context version may include a version identifier and system 200 can query an index to determine whether the version identifier corresponds to a base version or a particular scenario version.

In the example shown, system 200 implements one or more modules in connection with providing a planning service, such as to enable users to evaluate data on one or more data sources, such as in connection with running planning models or analyzing results across a set of planning models. System 200 comprises communication interface 205, one or more processors 210, storage 215, and/or memory 220. One or more processors 210 comprises one or more of communication module 225, request receiving module 227, hypercube updating module 229, formula evaluation module 231, base version determination module 233, scenario version creation module 235, multiple version management module 237, indexing module 239, update propagation module 241, scenario commit module 243, query response module 245, and/or user interface module 247.

In some embodiments, system 200 comprises communication module 225. System 200 uses communication module 225 to communicate with various client terminals or user systems such as a user system (e.g., client system 140) or an administrator system (e.g., administrator system 130), or other layers of system 100 such as a data layer 112, business application layer 116, data store 120, etc. For example, communication module 225 provides to communication interface 205 information that is to be communicated. As another example, communication interface 205 provides to communication module 225 information received by system 200. Communication module 225 is configured to receive one or more queries or requests to execute business logic (e.g., requests for processing workloads, servicing queries, etc.) such as from various client terminals or user systems (e.g., from the terminals or systems via a business application layer). The one or more queries or requests to execute tasks are with respect to information stored in one or more datasets (e.g., data stored in data store 120). For example, the communication module 225 receives requests for planning sessions, inputs to the planning sessions, such as edits to the base version or a scenario version, and/or queries against data in the hypercube for the planning sessions. Communication module 225 is configured to provide to various client terminals or user systems information such as information that is responsive to one or more queries or tasks requested to be executed (e.g., user interfaces comprising reports for the results). In some embodiments, communication module 225 provides the information to the various client terminals or user systems in the form of one or more data frames, reports (e.g., according to a predefined format or to a requested format), and/or via one or more user interfaces (e.g., an interface that the user system is caused to display).

In some embodiments, system 200 comprises request receiving module 227. System 200 uses request receiving module 227 to receive a query, such as from a user operating a client terminal (e.g., client system 140). Examples of queries include a request for a planning session, a request to edit/update a hypercube version, or a query against a hypercube version (e.g., to obtain a value based on the data for the hypercube version).

If the query is a request for a value from the hypercube, in response to receiving the query, request receiving module 227 may determine a set of requests to execute in connection with obtaining a result for the query. For example, request receiving module 227 determines a set of locations in the hypercube or accounts for the hypercube that are to be accessed and creates corresponding one or more reading processes to obtain the values for such locations and/or accounts. Additionally, or alternatively, request receiving module 227 receives a request to update the hypercube, such as a request to input a value at a particular location in the hypercube or a request to update a formula used in an account.

If the query is a request for a planning session and/or to edit/update a hypercube version, request receiving module 227 may determine a particular planning session or hypercube version associated with the request, determine a hypercube location(s) to be edited/updated, create or use one or more reading processes to query the hypercube, update values at hypercube locations, and/or to update a data structure (e.g., a value object) that maintains snapshot chains for the various hypercube versions.

System 200 may implement a transaction manager that is configured to create and assign a unique transaction object to every modification or set of modifications that occur with respect to the hypercube version or otherwise on the system (e.g., sheet-saves or imports). Inside a single version cache, writing processes serialize with each other and therefore the transaction manager can assign a single monotonically increasing sequence number starting (e.g., a unique number, such as an integer, from 1 to N) to each transaction which denotes the logical point in time marking an "atomic" commit of the transaction. Reading processes, such as evaluator sessions, reports and sheet loads are not transactions, but transaction manager creates a logical reader object which copies over the current sequence number (e.g., latest sequence number), for example, the latest committed transaction number into their control block. According to various embodiments, system 200 (e.g., multiple version management module 237) guarantees that all snapshots of data that are shown to this reading process will be consistent with respect to the sequence number established in the reader control block. In some embodiments, the reading process has an associated time stamp which enables the system to know what values of the hypercube are concurrent with the time stamp associated with the reading process. One thing to note here is that the notion of "transaction time and reader time" has to be mutually consistent with each other. If the system assigned commit numbers are used, they are used for both.

In some embodiments, system 200 comprises hypercube updating module 229. System 200 uses hypercube updating module 229 to receive a request to update a hypercube (e.g., a hypercube version), such as to update a particular location in a particular hypercube version (e.g., the base version or scenario version associated with the context version for the planning session) or an account that is based on values from the hypercube version. The update to the hypercube version can include insertion or deletion of a row/column, an update to a value at a particular location (e.g., a new value being input to the location), an update/modification to a formula at the particular location or account, etc.

In response to receiving the request to update the hypercube, system 200 uses the transaction manager to create a corresponding transaction record, such as a write transaction, and causes a process to be invoked to carry out the update (e.g., a writing process). Writes to a scenario version may be a stored in a transaction log, which system 200 (e.g., scenario commit module 243) can use to merge the scenario version to the base version (e.g., to set the base version to be the particular scenario version).

In some embodiments, in response to updating the hypercube, hypercube updating module 229 informs another module or service to propagate the update with respect to (i) a versioning of a snapshot for the corresponding location in the hypercube or account, (ii) other locations or accounts that depend on the location/account being updated (e.g., a formula that includes the value of the particular location as a direct or indirect input), (iii) a data structure (e.g., value object) for the particular location to update a snapshot chain (e.g., the applicable base snapshot chain or scenario snapshot chain), (iv) a data structure for another location in the particular hypercube version is dependent on the particular location being updated (e.g., to set an override bit or pointer to a particular snapshot), (v) a data structure for a location in another hypercube version that is dependent on the particular location being updated (e.g., to set an override bit or pointer to a particular snapshot).

In some embodiments, system 200 propagates the update to a particular location/account by updating a versioning data structure (e.g., the versioning information stored in the anchor object for the corresponding value object) to modify the validity periods of snapshots that are impacted by the update and/or validity of values in dependent value objects (e.g., to update snapshot pointers or values in locations dependent on the particular location being updated). For example, the validity period for the most recent snapshot for a particular location subject to an update may be updated to modify the end time of the validity period to be the time at which the update was made (or when the update was requested). System 200 may additionally cause a new snapshot to be captured with the updated value/formula at the particular location and the validity period for the new snapshot may be the time at which the update was made or requested.

In some embodiments, system 200 propagates the update to a particular location/account to other accounts or locations that are dependent on the value in the particular location/account. For example, in response to receiving the update, system 200 determines a set of other locations or accounts that are dependent on the particular location/account (e.g., either directly, or indirectly through other dependencies), and causes such other locations or accounts to be updated. The versioning information for such other locations or accounts may be correspondingly updated, such as to update the validity periods of current snapshots so that their end time is set to the commit time of the transaction or force the removal of those snapshots. as found associated with the anchor object at the locations.

In some embodiments, system 200 comprises formula evaluation module 231. System 200 uses formula evaluation module 231 to evaluate formulas stored at particular locations or accounts. Formula evaluation module 231 may include causing reading processes to be invoked to obtain input values for the formula and a formula engine that computes the result for the formula. Formula evaluation module 231 (e.g., a reading process invoked or directed by formula evaluation module 231) may obtain values from different locations and/or different versions. For example, if a particular location of a particular scenario version comprises a formula that depends on the values from another location the particular scenario version or a location in the base version, the corresponding values are obtained for evaluation of the formula.

In some embodiments, system 200 comprises base version determination module 233. System uses base version determination module 233 to maintain the base version of a hypercube. Base version determination module 233 may monitor edits to the base version and correspondingly update validity periods of base version snapshots. Additionally, base version determination module 233 may cause update propagation module 241 to propagate the edits to other locations in the base version that are dependent on the edited location and/or to other versions comprising locations that are dependent on the edited location. In response to an edit to the base version, the base version determination module 233 can capture a snapshot for the edited location in the base version and store the snapshot or pointer thereto in the corresponding data structure for the edited location.

In some embodiments, system 200 comprises scenario version creation module 235. System 200 uses scenario version creation module 235 to create new scenario versions for a particular hypercube. In response to a planning session being instantiated and system 200 receiving a request to create a new scenario version (e.g., a planning model based on the base version), scenario version creation module 235 causes the data structure(s) for the hypercube locations to comprise information for the newly created scenario version, such as override data or other information indicating whether the newly created scenario version has an override value that is to override the base version at a particular location. In some embodiments, scenario version creation module 235 causes the data structure to comprise a null pointer (or other predefined symbol/placeholder) or a pointer to the scenario snapshot chain for the newly created scenario version. Additionally, or alternatively, scenario version creation module 235 configures the override data comprised in the data structure(s) to include an override bit or other flag that can be set to indicate whether the newly created scenario version has an override value for the particular location(s). In some embodiments, when a scenario is created, a record is created in the database and a data structure is created in memory. The various value arrays (e.g., ValArrays) and other data structures that hold data do not need to be informed about the newly created scenario since the new scenario is empty and has no changes. Only when edits are made to the scenario, do the various data-holding data structures like value arrays (e.g., ValArrays) get impacted.

In some embodiments, system 200 comprises multiple version management module 237. System 200 uses multiple version management module 237 to manage/maintain a plurality of hypercube versions, including a base version and one or more scenario versions. Multiple version management module 237 manages/stores snapshots for the hypercube, such as base version snapshots (e.g., base snapshot chains for each location in the hypercube), and scenario version snapshots (e.g., scenario snapshot chains for each location in the hypercube and each scenario version).

In connection with providing a set of planning sessions associated with the hypercube, multiple version management module 237 instantiates the hypercube versions in a manner that several instantiated scenario versions can be supported by an instantiated base version. The scenario versions borrow a large portion of its values from the base version and thus a base version is used to support providing the scenario versions. A base version can usually support a plurality of scenario versions (on the order of hundreds) but at some point, the number of active scenario versions becomes too large such that the memory for the base version and all active scenario versions is larger than what a single server machine can support. Multiple version management module 237 utilizes horizontal scale out and augments the routing logic of horizontal scale out to treat scenario versions differently from base versions. Utilizing the horizontal scale out and augmenting the routing logic enables the system to accommodate a much larger number of active scenario versions than could otherwise fit in the memory of a single computer.

In some embodiments, system 200 implements the horizontal scale out to replicate the base version on multiple compute nodes. As the base version changes on a given node, those changes are replayed on the other nodes to keep the base version synchronized across all nodes (i.e., in order to achieve a consistent model).

In various embodiments, scenario versions are not replicated on multiple nodes and are instead loaded on at most one node. Scenario versions are private to a single user or shared with a small number of users. The performance benefit in having the scenario versions spread across multiple nodes is small while the additional complexity and overhead of maintaining multiple copies of the same version is high. In contrast, the base version must exist for a scenario to exist so the base version must be replicated across multiple nodes. In addition, many concurrent users will use the base version, so having it replicated across multiple nodes also improves performance. Because scenario versions are not replicated across multiple nodes in such embodiments, a scenario edit needs only be merged to the data structures of the node in which the scenario version resides.

Routing logic is used to determine where to send a request for a given scenario. In various embodiments, system 200 configures the routing logic according to the following logic:

1. Is the scenario version loaded on some node? If so, direct the request to that node.
2. Is the base version loaded on some node and is the number of scenario versions loaded in the base version under a predefined threshold?:
   a. If the base version is loaded on some node and the number of scenario versions loaded in the base version is under the predefined threshold, direct the request to that node;
   b. If the base version is not loaded on some node (e.g., the determination of the number of scenario versions loaded in the base version being under the predefined threshold is not relevant in this case), select a node to host the base version and send the request to the selected node. When that selected node receives the request, it will determine if the base version is in memory (e.g., it will not be in this use case). If not, the node will load the base version into memory and then load the scenario version.
   c. If the base version is loaded on some node and the number of scenario versions loaded in the base version is not under the predefined threshold, direct the request to a newly selected node; then the system repeats the actions of step b, but our motivation in this case is to perform a scale out operation in which an additional copy of the base version is loaded on a node to accommodate additional scenario versions. The system picks a node to host an additional copy of the base version and direct the request to this node. It will then follow the same steps as with b.

Horizontal scale out is further described in U.S. Patent Application Publication No. 2023/0244602, the entirety of which is hereby incorporated herein for all purposes.

Multiple version management module 237 is configured to capture snapshots of a value for value objects associated with a hypercube, such as a value at a particular location or a value for an account, etc. Multiple version management module 237 captures snapshots for various versions, including the base version and a set of one or more scenario versions associated with the hypercube. The system captures the snapshots in response to determining that an edit is made to the corresponding location. Additionally, the system may capture the snapshots in response to determining that the value is to be obtained by a reader process, and the system does not already store a previously captured snapshot that remains valid (e.g., that the value in a cell has changed). For example, when the reading process queries the data structure (e.g., the value object) associated with a particular location, the reading process determines that the value is to be evaluated (e.g., if the particular version comprises a formula at the particular location) or if the value is being obtained and the system does not store a currently valid value for the particular location (e.g., the value is being obtained for the first time since creation or an edit).

In some embodiments, the snapshot is stored in a snapshot dataset and a pointer to the snapshot may be stored (e.g., as snapshot information) in a data structure (e.g., an anchor object for the value object), etc.

In some embodiments, multiple version management module 237 captures the snapshots in response to the value for the value object being modified (e.g., a value at a particular location in the hypercube being updated, etc.). For example, system 200 causes a new snapshot to be captured and the corresponding data structure (e.g., an anchor object for the value object associated with the location) to be updated, such as to update the snapshot information (e.g., update a snapshot chain to include a pointer to the newly captured snapshot) and/or to update the version information (e.g., to update the validity period of the new snapshot and/or the previous snapshot).

The fine-grained versions of captured values for the location according to various embodiments are referred to as snapshots, which reside in a snapshot chain pointed to by an anchor object (e.g., snapshot information comprising pointers to snapshots in the snapshot chain). According to various embodiments, the data structure (e.g., the anchor object associated with the value object) is the primary object that is being versioned for value objects—for example, dimension containers such as splits or tuples, internal data structures which serve as containers for numeric facts entered by users (input accounts), etc.

According to various embodiments, each snapshot is a copy of the data, which is created when a user either inserts, updates, or deletes at a particular location on a sheet. For example, each user action that corresponds to a change is associated with a transaction object which in turn is defined by a numeric monotonically increasing sequence number that denotes the logical commit time of the same transaction.

In some embodiments, the anchor object for a particular location/account is itself the very first snapshot that is created when a value is input for a location or account. The validity period for the very first snapshot typically has a start time of TXN.commitNumber and endTime=INF, where TXN is the transaction (sheet-save) operation which inserted the row and where INF indicates that the end time is at infinity (or that the value does not have an ending time or is valid forever). For rows that existed since eternity (e.g., were already in the database at the time the planning server starts up), the start time is set to 0.

In some embodiments, versioning for planning models is accomplished by creating copies of a data object on write. These copies are referred to as snapshots and can be stored in a snapshot dataset. Accordingly, a sequence of modifications results in a chain of snapshots with each snapshot being a copy of the datum in the earlier snapshot, but with potentially new values.

Related art systems may embed objects inside a history object that contains multiple versions of the same object. In contrast, various embodiments use the very first copy (e.g., snapshot) of the value object as being chosen as an anchor and all future versions are in a data structure (e.g., typically a list or an array) that is pointed to by the anchor object. This design allows for indexing structures that reference objects of a specific type to continue to refer to and retrieve objects of the same type.

In some embodiments, in response to determining that an update or a delete is performed at a particular location, a CopyOn WriteSnapshot is created. Creation of this snapshot does two things: (i) new copy of the data is created and new values or overwritten values are recorded in this copy, and (ii) a new snapshot is created which points to this copy with bounds (e.g., a validity period) of (TXN.commit_number, INF) where TXN is the transaction doing the modification. In the case of deletes, system 200 creates a new snapshot that points to NULL and this is called a delete marker. The erstwhile latest snapshot in the snapshot chain, which by definition has end time=INF, is modified to set the end time to TXN.commit_number (e.g., to invalidate such previous snapshot for any reading processes having a timestamp that is after the time at which the value object is updated).

In some embodiments, each snapshot has an associated validity period (e.g., a validity period that starts at a start time and ends at an end time), which defines the validity period of the snapshot. As an example, the copy of data associated with the snapshot is valid for all times T such that start time<=T<end time. In some embodiments, the start time is inclusive while end time is exclusive.

According to various embodiments, a snapshot is logically defined by three characteristics: (i) a start time of the corresponding validity period, (ii) an end time for the corresponding validity period, and (iii) a pointer to a copy of the data which contains values valid for that time range. For example, system 200 stores these three characteristics collectively across the snapshot information and the snapshot version information comprised in the corresponding anchor object.

In some embodiments, a snapshot that holds a calculated value (e.g., a snapshot for a value object comprising a formula) is invalidated when one of the input accounts/locations that contributes to this value is modified, and the end time of the computed snapshot is INF. The invalidation may take the following forms:

If no reading processes are active at the time of the modification, system 200 can simply mark the numeric evaluated values in the snapshot to be invalid. This forces all future reading processes to re-evaluate this formula value.

If a set of one or more reading processes are active at the time of modification, one or more of the reading processes could be reading from, have read, or may shortly re-read the computed values in this location which makes invalidating the values themselves either incorrect or inefficient. Therefore, system 200 performs a logical invalidation step in which the end time of the snapshot is moved from INF to the TXN.commitNumber where TXN is the transaction object associated with the modification.

In some embodiments, multiple version management module 237 is configured to determine a snapshot version that a particular reading process is to access. System 200 determines a snapshot matching a reading process, such as based on the validity period of the snapshot and/or a timestamp associated with the reading process. For example, in response to determining that a reading process attempts to access/obtain a value for a particular location, multiple version management module 237 determines the corresponding snapshot in the snapshot chain (if any) that matches the time reading process. Multiple version management module 237 can determine a snapshot matching the reading process based on determining the snapshot having a validity period with which the timestamp intersects (e.g., where the timestamp is between the start time and end time of the validity period).

In some embodiments, multiple version management module 237 performs a cleanup with respect to stored snapshots to remove snapshots that are no longer needed. For example, multiple version management module 237 removes (e.g., deletes) the snapshots having a validity period with an end time that is before the time associated with an earliest reading process.

In some embodiments, multiple version management module 237 maintains the data structure (e.g., an anchor object) associated with a value object for a particular location. For example, multiple version management module 237 configures and updates override data indicating whether a set of scenario versions have a scenario override value (e.g., a scenario value that is intended to override the base version at the corresponding location) that is to be used in place of the base version value. The override data may comprise (i) a set of override bits that can be used as a quick reference indicating whether a particular scenario version overrides the base version at the location, and/or (ii) a set of pointers to scenario version snapshots or null pointers (or other predefined symbol) if the corresponding scenario version does not have a scenario override value that overrides the base version at the location. The data structure for a particular location may be updated as updates are propagated from the base version or other locations in a scenario version on which the scenario value depends at the particular location.

In some embodiments, system 200 comprises indexing module 239. System 200 uses indexing module 239 to generate or maintain one or more indexes from one or more dimension values to a set of tuple objects satisfying the corresponding dimension value. These indexes can be useful when servicing or evaluating formulas with predicates, such as ACCT.A[region='US']. In such an example, system 200 identifies all tuples which have US for the region dimension and include those tuples in the calculation by obtaining the value of account A.

Some related art systems evaluate account A by iterating all tuples that have values for account A (e.g., ACCT.A) and evaluating "region="US" separately. Such a process is inefficient due to the repeated predicate evaluation, particularly if the number of tuples is relatively high (e.g., in the millions).

Various embodiments create and maintain an index between dimension values to a set of tuples matching that dimension value. In connection with evaluating account A, system 200 can perform a lookup for region='US' in a dedicated index for the region dimension. The lookup may return a tuple set. The tuple set is typically returned as a bit set in which each bit corresponds to the tuple identifier of a satisfying tuple.

In some embodiments, because the system implements a multi-versioning of data for a hypercube, when performing the lookup against the index for a tuple set, system 200 can perform an additional validity check on the tuple. For example, system 200 determines whether the tuple is valid for the timestamp associated with the reading process. If the tuple is determined to be valid for a particular reading process, the tuple is included in the calculation (e.g., the computation of account A in the example above). Conversely, if the tuple was determined to not be valid for the reading process, system 200 excludes the tuple in performing the calculation (e.g., the computation of account A in the example above). System 200 may determine that the tuple is not valid for a particular reading process based on a determination that the tuple was deleted prior to the timestamp associated with the particular reading process (e.g., the start of the reading process). Additionally, system 200 may determine that the tuple is not valid for a particular reading process in response to determining that the tuple was inserted after the timestamp associated with the reading process (e.g., the tuple was inserted after the reading process was started).

The foregoing example assumes that tuple dimensions do not change after creation, and the only operations permitted on the tuple are insertion and deletion. According to various embodiments, the dimension values for a tuple can be modified potentially several times. Examples are tuples which exist at specific cube locations, such as rows on a configurable modeled sheet. For a hypercube, system 200 may store multi-dimensional indexes that map from dimension values (e.g., Region=US) to a bit-set of tuples (e.g., tuple identifiers) that correspond to the tuple locations that satisfy that dimension value. A multi-dimensional index can map dimension values to a collection of rows inside a model that have the corresponding value for that dimension.

Without such an index, the system would have to run a report or perform a calculation that involves aggregation of a certain account for a particular dimension value or set of dimension values, and the system would have to retrieve all records from that cube or model regardless of whether it is useful or not useful and evaluate the dimension value for every such tuple which makes determining the report more expensive.

As an illustrative example, if a model has ten rows with a single dimension region such that rows 1, 4, 5 have dimension value LA; rows 2, 6 have dimension value CO; and rows 3, 7, 8, 9, 10 have dimension values NY. According to various embodiments, for such an example the bitmap index has three entries, such as one for each dimension value that exists in the model (e.g., a first entry for value "LA", a second entry for value "CO", and a third entry for value "NY"). System 200 can store a list in association with (e.g., attached to or within) each entry in which the list denotes the locations that correspond to that particular dimension value. For example, the list identifies the set of row identifiers that correspond to the dimension value associated with the entry.

Using the example above, system 200 can represent the first entry for value "LA" as $\{1,4,5\}$ or as a bitset [1001100000]. System 200 can represent the second entry for value "CO" as $\{2,6\}$ or as a bitset [0100010000]. System 200 can represent the third entry for value "NY" $\{3,7,8,9,10\}$ or as a bitset [0010001111].

In some embodiments, indexing module 239 indexes dependencies between locations in a particular hypercube version or dependencies across hypercube versions. As an example of a dependency between locations in a particular hypercube, a first location may store an input value and a second location stores a formula that depends on/uses at least the value at the first location; the second location is thus dependent on the first location. As an example of a dependency across hypercube versions, a first location in a base version may store an input value and a second location in a particular scenario version (e.g., the second location may correspond to the same or different hypercube location as the first location) may store a formula that depends on/uses the value at the first location in the base version; thus the second location in the particular scenario version is dependent on the first location of the base version. Indexing module 239 may index these dependencies in values across hypercube locations and/or hypercube versions in connection with propagating updates to a particular location in a particular version. For example, system 200 determines the snapshots in other locations/versions that are to be set as invalidated as a result of the update to the particular location.

In some embodiments, system 200 comprises scenario commit module 243. System 200 uses scenario commit module 243 to set a particular scenario version as a new base version. For example, system 200 merges the particular scenario version to the base version. In some embodiments, system 200 (e.g., hypercube updating module 229) stores a transaction log comprising a set of transactions performed with respect to the particular scenario version. In response to determining that the particular scenario version is to be merged to the base version, the system obtains the set of transactions from the transaction log and writes those transactions to the base version. The set of transactions are rewritten to the base version (e.g., instead of simply copying or renaming the scenario version to be merged) because the security access rights for the user requesting the merge may have changed from the time the scenario version edit was made to the time the merge was performed.

Scenario commit module 243 is configured to resolve conflicts between edits to a base version and edits to the particular scenario version to be merged and set as the base version. An edit to the base version that overlaps with an edit to a scenario version will appear to be hidden in the scenario version. At merge time, scenario commit module 243 defines rules to determine how to resolve a conflict between an edit in the base version that overlaps with an edit in the base version. Examples of rules that may be implemented in various embodiments include: (i) when a scenario version is merged, all changes in the scenario version take the place of those in the base version, regardless of whether the edits in the base version were made before or after the scenario version was created; (ii) when a scenario version is to be merged, system 200 prompts the user (e.g., the user requesting the merge or the administrator or owner of the base version) to determine which edit to keep when there is a conflict between the scenario version and the base version, (iii) when the scenario version is merged, use edit times of a location in the scenario version and the base version to skip scenario changes that are older than the base version change. In some embodiments, the scenario edits always trump the base version. In some embodiments, time stamps are not maintained on edits in the base version and thus the system can not determine whether a base version edit happened before or after a scenario version edit. In some embodiments, time stamps are maintained on edits in the base version and thus the system can determine whether a base version edit happened before or after a scenario version edit. In some embodiments, the system selects a later edit version as the appropriate version.

In some embodiments, system 200 comprises query response module 245. System 200 uses query response module 245 to aggregate the data obtained for the set of requests to obtain a response to the query.

In some embodiments, system 200 comprises user interface module 247. System 200 uses user interface module 247 in connection with configuring information (or the display thereof) to be provided to the user such as via client system 140 and/or administrator system 130 of system 100. In some embodiments, user interface module 247 configures a user interface to be displayed at a client system, such as an interface that is provided in a web browser at the client system. User interface module 247 may configure a user interface via which a query may be input. In some embodiments, user interface module 247 configures a user interface to provide a response to the query, such as by providing one or more reports of information that is responsive to a query or task executed with respect to the source dataset(s) (e.g., a query or task executed against data stored on data store 120).

According to various embodiments, storage 215 comprises one or more of file system data 260, base version data 265, and/or scenario data 270. Storage 215 comprises a shared storage (e.g., a network storage system). In some embodiments, file system data 260 comprises a database such as one or more datasets (e.g., one or more datasets for one or more tenants, etc.). File system data 260 comprises data such as a dataset for historical information pertaining to user activity, a human resources database, a financial database, etc. In some embodiments, base version data 265 a snapshot dataset of a set of base version snapshots for one or more value objects associated with a hypercube. The set of snapshots associated with a particular value object may include a versioning of the value for the value object. The base version data 265 may further comprise version information for the set of snapshots stored in the snapshot dataset. For example, base version data 265 comprises respective validity periods for the set of snapshots. Version information for a particular snapshot of a value object may be stored in an anchor object for the value object. The anchor object may be stored within the value object. In some embodiments, scenario data 270 stores a snapshot dataset of a set of scenario version snapshots for one or more value objects associated with a set of scenario versions for a hypercube. The scenario data 270 may further comprise one or more of (i) the version information for the set of scenario version snapshots and/or (ii) one or more transaction logs that respectively store transactions/edits to a scenario version(s).

According to various embodiments, memory 220 comprises executing application data 275. Executing application data 275 comprises data obtained or used in connection with executing an application such as an application executing on a tenant. In some embodiments, the application comprises one or more applications that perform one or more of receiving and/or executing a query or task, generating a report and/or configuring information that is responsive to an executed query or task, and/or providing to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3:
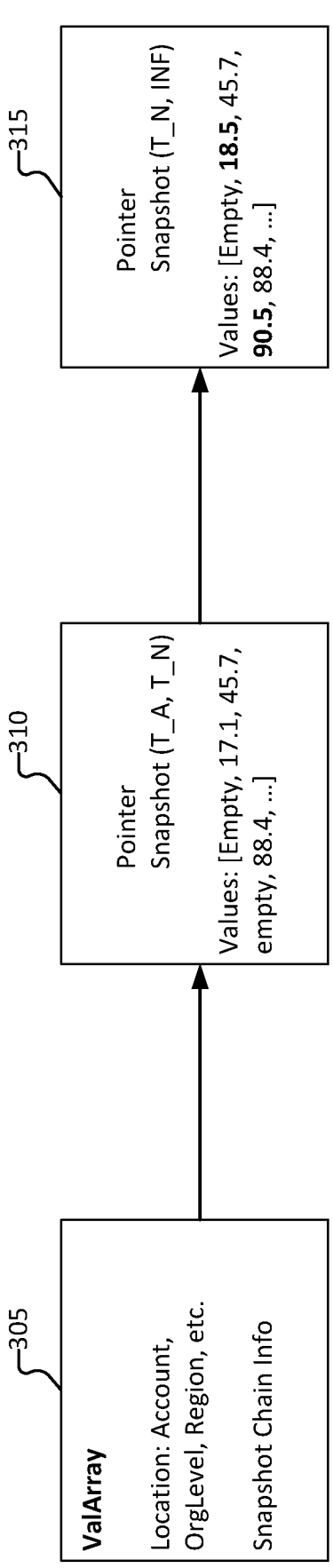
FIG. 3 illustrates an example of a data structure storing a snapshot chain for a particular location in a hypercube according to various embodiments of the present application.

FIG. 3 illustrates an example of a data structure storing a snapshot chain for a particular location in a hypercube according to various embodiments of the present application. In some embodiments, the system stores one or more data structures in association with a hypercube. The system may store a data structure for each location in the hypercube. In some embodiments, the data structure comprises snapshot information for the versions of the hypercube, such as snapshot information for the base version and snapshot information for one or more scenario versions (e.g., override snapshot chains). The storing, maintaining, and using of snapshots is further described in U.S. patent application Ser. No. 18/522,728, the entirety of which is hereby incorporated herein for all purposes.

In the example shown, system 300 (e.g., a system storing a hypercube) comprises value object 305 for the hypercube and an associated snapshot. System 300 may store snapshot information (e.g., a pointer to the snapshot) and version information (e.g., a validity period for the snapshot) in association with value object 305. In some embodiments, value object 305 corresponds to a particular account, organization level, region, etc. stored at a location in the hypercube.

In some embodiments, value object 305 comprises the coordinates associated with the data and one or more array-like data structures that contain the numeric values for each time-period in which data exists. The array-like data structures are indexed by the time intervals for which they are valid.

In some embodiments, information for value object 305 may be stored in a corresponding anchor object (e.g., a data structure, such as a data structure for the corresponding hypercube location). For example, system 300 stores the snapshot information and version information as entry 310 in an anchor object for value object 305 (e.g., a particular location in the hypercube). As illustrated, entry 310 corresponds to the first snapshot captured for value object 305, such as at the time of creation. The validity period for the first snapshot can be denoted as (creation time, $T_N$). In the example shown, the creation time may be denoted by $T_A$. Additionally, system 300 stores entry 315 in an anchor object (e.g., a storage structure) for value object 305. As illustrated, entry 315 corresponds to a second snapshot for value object 305. The second snapshot is captured at time $T_N$, which corresponds to a time at which the value for value object 305 or a value on which the value object 305 depends has changed. The validity period for the second snapshot can be denoted as ($T_N$, INF) (e.g., INF may indicate that the snapshot is indefinitely/infinitely valid until an event invalidates the snapshot).

In some embodiments, the data structure for the particular hypercube location (e.g., the anchor object) stores snapshot information for a set of one or more snapshots of the value object 305. The anchor object can store a set of pointers for the various corresponding snapshots. Additionally, or alternatively, a snapshot or snapshot pointer can comprise a pointer to a next snapshot in the snapshot chain (e.g., a snapshot valid in an immediately subsequent time period). The last snapshot in the snapshot chain may have a null value (e.g., a null pointer) for the pointer to the next snapshot, and the null value may be updated to include a snapshot pointer upon creation of a new snapshot in the snapshot chain.

In the example shown, the second snapshot is captured, and entry 315 is generated in response to a value for the particular location changing. The second and fourth elements in the array of values are changed in the second snapshot relative to the first snapshot. As an example, the second element is changed from 17.1 in the first snapshot to 18.5 in the second snapshot. As another example, the fourth element is changed from empty (e.g., null) in the first snapshot to 90.5 in the second snapshot.

In the example illustrated in FIG. 3, value object 305 indicates that for the corresponding location of the hypercube some data existed at time $T_A$. Time $T_A$ may be the point at which the version of the hypercube was first accessed and loaded into memory and represents or indicates the data that existed (in the database) for the version at load time. At some point after time $T_A$ (e.g., time $T_N$), the data was changed at this location. If there is a reading process (also referred to as a reader) that started (or otherwise is intended to process data) before Time $T_N$ (e.g., a reading process having a timestamp before $T_N$), the system maintains the older version of the data (e.g., the system stores the first snapshot) and a second version of the data is created (e.g., the system captures a second snapshot) that is valid from time $T_N$ to the end of time (e.g., denoted by INF, at least until the value at the corresponding location is changed again). In some embodiments, to create the new snapshot, the system copies the previous version of the data and writes the edits on top of the copied snapshot. The edits may be logged in as a set of transactions.

In some embodiments, the system stores a plurality of versions of the hypercube, such as to provide a set of scenarios for a planning session. The plurality of versions of the hypercube comprises a base version and a set of one or more scenario versions. The scenario versions can be configured by a user or other system to implement forecasting or otherwise predict outcomes given certain changes relative to the base version. In some embodiments, a scenario version is not a version of the hypercube that is independent of the base version. For example, a scenario version first borrows all the values from the corresponding base version and then stores edits that are made to the hypercube to be used as an override for the base version (at least in the context of implementing a planning session using the scenario version). Thus, a scenario version generally has a significant number of values, base version formulas, and a smaller number of overrides (e.g., a scenario version has pockets of new values that are to be implemented to override the corresponding values in the base version).

Because a significant portion of a scenario version overlaps with the base version (e.g., the scenario borrows a significant number of values from the base version), the system is configured to load the values from the base version and the override values for the scenario version to avoid duplicative loading of the base version values. The system is configured so that scenario versions do not take up as much memory as the corresponding base version. As an example, if the base version is 10 GB, the scenario version should not be as large because its size may be related to the amount of values changed in the scenario version relative to the base version (e.g., the size of the scenario version should be based on the parts of the base version hypercube that are being overridden by the scenario version).

The implementing of planning sessions to run various scenarios of the hypercube is computationally expensive. Because scenario versions share a lot of the same computations from the base versions, the system enables the planning session (e.g., a reading process) to use base computations from the base version. Further, scenario computations for a particular scenario version can be used by other users (e.g., other planning sessions) using that scenario version. In some embodiments, the system loads the base version and/or a set of scenario versions in a manner that saves memory and compute time when loading a set of planning sessions that are running different versions of a hypercube as compared to a manner of loading complete versions of the hypercube for each scenario version (e.g., a manner that does not take advantage of the fact that the scenario version borrows a significant amount of data/values from the base version).

In some embodiments, the scenario version is a live construct that stores a delta between the scenario version and its corresponding base version (e.g., similar to an incremental backup) but allows changes to be dynamically resolved across the base version and other scenario versions. The system can store the incremental change between the scenario version and the base version and can then instantiate the scenario version by implementing the base version as modified by the incremental changes of the scenario version. For example, the system can create the use case of the scenario version by taking the base version and then taking/calculating what is necessary to implement the incremental changes of the scenario version (e.g., implementing/writing the set of transactions corresponding to edits of the scenario version).

A scenario version can be created that has no overridden values of the base version. In this manner, every value in the scenario version is the same as the corresponding value in the base version. If the base version changes, the scenario version correspondingly changes because this hypothetical scenario version has no overridden values. At the other end of the spectrum, a scenario version could exist in which every literal input value has an override value in the scenario version (e.g., every location of the hypercube is different between the base version and the scenario version). In this manner, every input value is unique in the scenario version (e.g., relative to the base version), but in addition, every derived/computed value is also unique because computed values are derived from the values of input locations. In practice, scenario versions comprise few overrides, at least in comparison with the total number of possible overrides.

If a change is made to one input location in a scenario version, that value now has a unique value in the scenario version which is different from the existing value in the base version (e.g., the input value is an override value). If the changed value is referenced in a formula (e.g., a formula in a different location of the base version or scenario version), the value backed by the formula now has a unique value in the scenario version and a different value in the base version. Thus, edits to scenario versions, by virtue of formula interactions, create little groups of unique values that are derived from the edited scenario locations. If a user is viewing data in a scenario version, some of that data will be unique to the scenario version (e.g., because it is directly changed or derived from something that has changed) and some of the data may be identical to the base version (e.g., because it was not directly changed or not derivable from something that was directly changed in the scenario version). In practice, the amount of data of a scenario version that is identical to the base version is a substantial percentage of the overall data in the base version.

Thus, if it is imagined that there are a base version B and scenarios of the base version S1, S2, and S3 (e.g., the scenario versions) and it is considered that there is a "value-space" (the space of all input and derived values in the multi-dimensional hypercube), it is assumed that a sizable percentage of this space is identical among B, S1, S2, S3. Various embodiments implement the scenarios to take advantage of this fact to reduce the time-cost of computing formulas and the space-cost of representing formulas and their results in memory.

In some embodiments, scenario versions are configured to maximize or otherwise take advantage of the sharing of computed values and their memory storage. In some embodiments, the time-cost function is minimized by having users (e.g., a user or system using a planning session) in scenario versions compute values that are usable by users in working in either the base version or in another scenario of the base version (e.g., other users or systems using a different planning session to work from a different version of the corresponding hypercube). The space cost is reduced by sharing the same data structure comprising the computed formula, when possible, with users of the base version and users working in other scenario versions.

As an illustrative example, a formula like: Product_Revenue=Product_Price*Product_Units is assumed. The base version is named Budget 2024; and two scenario versions relative to the base version are stored, the scenario versions respectively being named BestCase and WorstCase. In this example, the Budget 2024 version has values of Product_Price=100, Product_units=100,000 for some dimension combination; the BestCase scenario has not overridden either Product_Price or Product_Units at the same dimensional combination (e.g., at the same location in the hypercube); and the WorstCase scenario has overridden the Product_Units value to be 50,000 but left the Product_Price value unchanged. Given this example, if a base version user were to view the value of Product_Revenue at the dimension combination, the system provides a value of 10,000,000 (e.g., 100*100,000). Similarly, the system would return the same value to a user in the BestCase scenario because there are no overrides for the terms of the formula. In contrast, the system provides a different value to a user in the WorstCase scenario. For example, the Product_Revenue value returned for the WorstCase scenario at the same location of the hypercube is 5,000,000 (e.g., 100*50,000). In this example, the planning sessions instantiating the base version users and BestCase scenario can help each other to compute formulas that are valid for both of their situations. The value computed can be shared by both groups of users and thus use less memory than having two unique copies of the computation.

Figure 4:
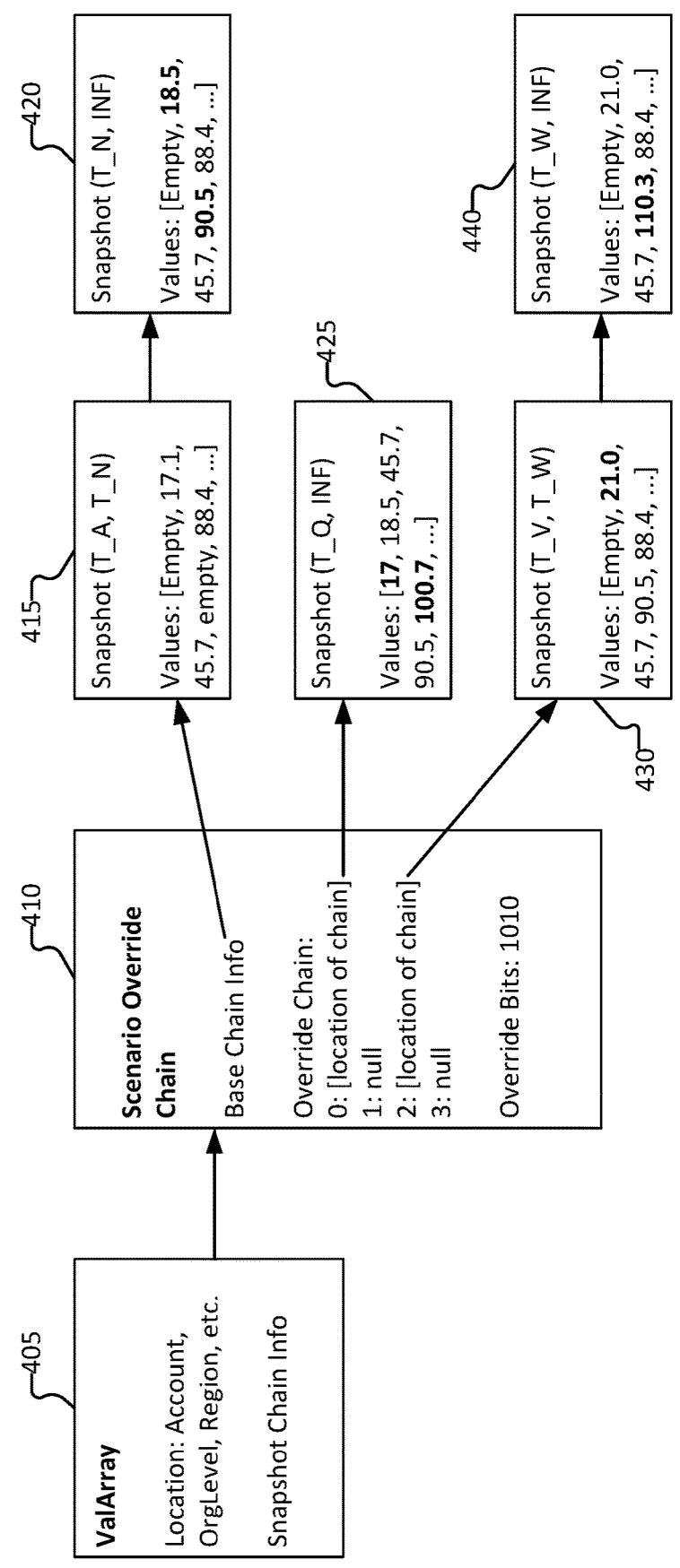
FIG. 4 illustrates an example of a data structure storing override data for a particular location in a hypercube according to various embodiments.

FIG. 4 illustrates an example of a data structure storing override data for a particular location in a hypercube according to various embodiments. In the example shown, the system 400 implements a data object 405 (e.g., a data object associated with a particular location in a hypercube) and stores snapshot information for a plurality of versions of the hypercube, such as a base version and one or more scenario versions. The snapshot information can comprise a snapshot chain for the various versions of the hypercube (e.g., a base snapshot chain for the base version, a scenario snapshot chain for a particular snapshot chain, etc.).

In some embodiments, data object 405 (e.g., an anchor object for a value object for a hypercube location) comprises override data or a pointer to override data for the corresponding location in the hypercube. For example, data object 405 comprises override data 410. The override data can indicate whether the base version value at the corresponding location is overridden for the set of scenario versions. Additionally, the override data comprises snapshot chains for the base version and respective snapshot chains for the set of scenario versions. Alternatively, the override data may comprise pointers to the base snapshot chain and the applicable scenario snapshot chains.

In the example shown, override data 410 comprises a base snapshot chain (or a pointer to the base snapshot chain) for the base version, which includes first base snapshot 415 (e.g., having a validity period of $(T_4, T_N)$) and second base snapshot 420 (e.g., having a validity period of $(T_N, INF)$). Additionally, override data 410 stores information indicating one or more of (i) a set of scenario versions that are implemented for the corresponding hypercube, (ii) whether a particular scenario version overrides the base version (e.g., whether the scenario version has a value that overrides the value of the base version), and (iii) the scenario snapshot chain(s) or a pointer to such scenario snapshot chain(s). As illustrated, the information stored in override data 410 indicates the hypercube has four implemented scenarios, which can be denoted by particular scenario identifiers. The scenario identifiers may be stored in a scenario index. As an example, the scenarios are denoted by scenario version 0, scenario version 1, scenario version 2, and scenario version 3.

In some embodiments, the override data 410 stores one or more indicators that indicate whether a particular scenario version overrides the base version. For example, the override data 410 stores a set of override bits with each bit corresponding to a particular scenario version and being set to indicate whether the scenario version has an override value or whether the base version value is used. In the example shown, the override data 410 comprises a set of override bits having values 1010, which indicates that the scenario version 0 and scenario version 2 have override values, and that scenario version 1 and scenario version 3 use the corresponding base version value.

In some embodiments, override data 410 stores an override chain. The override chain may comprise or point to a set of scenario snapshot chains corresponding to the set of scenario versions implemented for the corresponding hypercube. For scenario versions that do not have a corresponding override value (and thus no corresponding scenario snapshot chain for a given particular location), a null value or other predefined identifier may be stored. In the example shown, because scenario version 1 and scenario version 3 do not store override values, the override chain stores a null value for scenario version 1 and scenario version 3. The override chain stores a snapshot chain for scenario version 0 (or a pointer to the snapshot chain), which comprises first scenario snapshot 425. Similarly, the override chain stores a snapshot chain for scenario 2 (or a pointer to the snapshot chain), which comprises first scenario snapshot 430 and second scenario snapshot 440 having different/corresponding validity periods. First scenario snapshot 430 has a validity period of $(T_V, T_W)$, and second scenario snapshot 440 has a validity period of $(T_W, INF)$.

In some embodiments, a reading process uses data object 405 (e.g., a data structure for the corresponding location of the hypercube), including override data 410, to determine a value to return for the planning session. The reading process determines the applicable value to return based at least in part on the context version, such as an indication of the applicable version of the hypercube being implemented (e.g., a base version or a particular scenario version). For example, if the context version indicates that the base version is being implemented, the reading process obtains the applicable base version value from the base snapshot chain. The reading process can determine the base version snapshot based on the applicable validity period (e.g., the base version snapshot having a validity period intersecting with the time of the reading process). As another example, if the context version indicates that a particular scenario version is being implemented, the reading process queries override data 410 to determine whether the particular scenario version has an override value. If the particular scenario version does not have an override value, the reading process obtains the applicable base version value (e.g., using the same logic as noted above for obtaining the value when the base version is being implemented, such as by obtaining the value from the applicable base version snapshot from the base snapshot chain). If the system determines that the particular scenario version does have an override value (e.g., based on querying the override bits), the reading process obtains the applicable override value by obtaining the value from the applicable scenario version snapshot from the applicable scenario snapshot chain.

In some embodiments, the system implements data structures (e.g., value objects, such as data object 405) to efficiently represent, in memory, data in the multi-dimensional hypercube that can comprise values in the base version along with values in one or more scenario versions.

In some embodiments, the system implements the data structures to determine for a given computed value whether that computed value can be reused by a reading process in a scenario version or if a unique "scenario specific" value must be computed and stored in the same location.

In some embodiments, the system implements logic to ensure that as values in the base version are changed, any scenario overrides (e.g., override values in scenario versions) at the changed location are properly merged with values of the base version such that the scenario logic of "reading process obtains base version value unless there is a scenario version override" is preserved.

In some embodiments, the system implements logic to merge the changed values in a given scenario version back into the underlying base version. The system considers possible consistency rules defined on the hypercube, handling possible changes in the underlying hypercube between the creation and the merge of the scenario version, and rules how to merge different independent scenario versions back into the base version.

In some embodiments, the system performs a horizontal scale-out of computer resources to allow more scenarios than could otherwise fit in memory of a single computer.

In some embodiments, the scenario version lives inside the base version (e.g., in data structure(s) for the hypercube) as a series of "overrides" in which the scenario version has overridden some value in the base version. In addition, the hypercube may have locations that have no data in the base version, but which data has been created in a scenario version. In this case, the scenario version has not overridden some piece of data in the base version—it has entered a value in which the base version has no value.

In some embodiments, the data object (e.g., data object 405) can store (or point to) both input values and computed values. For input values, it is easy to determine if the given location represented by the data object has unique, scenario-specific, values. To do this, the system needs only look in the scenario-specific snapshot chains to observe if they are populated (e.g., that override data 410 does not have a null pointer for such scenario). The scenario-specific snapshot chains are populated when the scenario with previously saved data is instantiated or whenever edits are made to the scenario version (e.g., when a scenario edit happens, the system writes the change to the in-memory data structure by populating the scenario specific chain, and the system may write the change to a transaction log that can be used to merge the scenario version to the base version).

For computed values (e.g., for locations having formulas), determining whether the system needs to populate a scenario-specific value is more difficult. For many scenario versions, the base value stored in the base chain will have the same value in the scenario version. This will be the case if the formula never references, either directly or indirectly, another data structure that contains a scenario override. To minimize/reduce the time-cost of computing formulas and the space-cost of representing formula results, the system is configured to reuse the base value as much as possible.

In some embodiments, the override bits are comprised in a bit vector in which each position represents a scenario index of a scenario in memory. The purpose of the override bits is to allow the system to quickly (e.g., immediately) determine if the given data structure either contains or needs to contain (e.g., the scenario version value is to be computed) an override for the scenario version with the index of the position in the bit vector. For input values, the override bits are set when a scenario-specific override is populated. For computed values (e.g., for locations having formulas), the override bits are set in two ways:

When a formula is computed in the base version or some scenario version, the system keeps track of the override bits of each data structure that contribute to the result (e.g., each data structure corresponding to a location on which the evaluated formula has a dependency). The override bits are OR'ed together and the final value becomes the value of the override list for the data structure that comprises the formula result.

When a scenario edit happens or a scenario is instantiated by replaying a series of past edits, the system uses an invalidation process and the dependency grid to determine data structures that are dependent on the scenario edit location and set the override bit corresponding to the scenario.

Figure 5A:
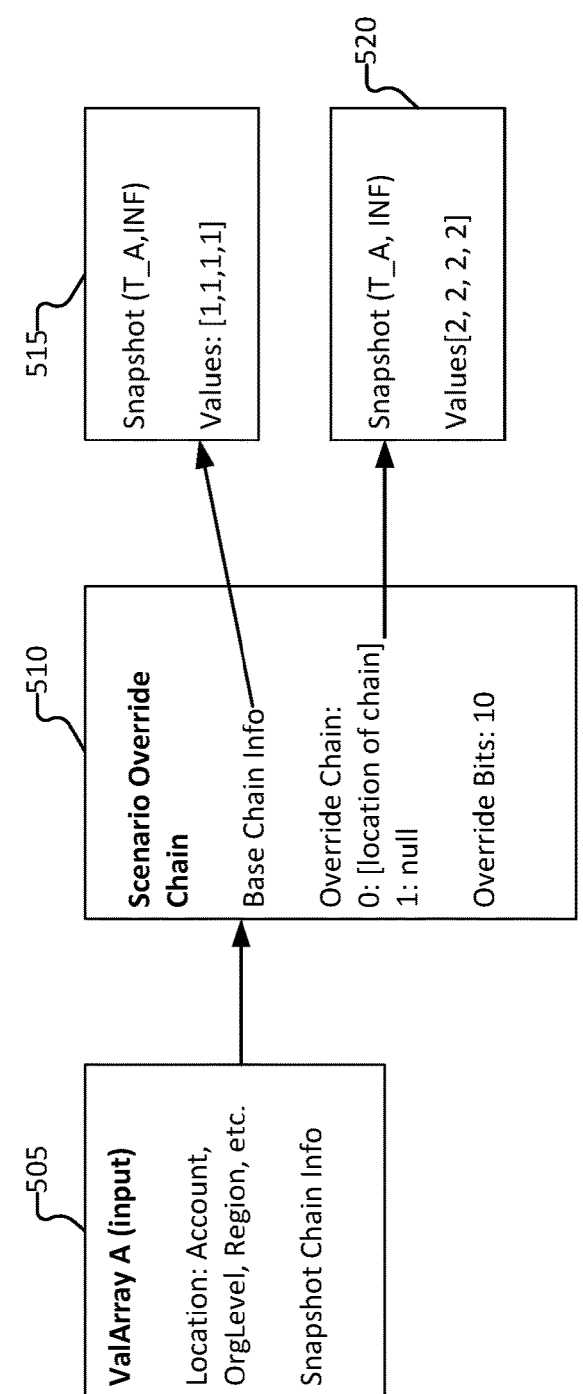
FIG. 5A illustrates an example of a data structure storing override data for hypercube location A according to various embodiments.

FIG. 5A illustrates an example of a data structure storing override data for hypercube location A according to various embodiments. In the example shown, hypercube location 500 comprises a data structure (e.g., value object 505) that indexes a plurality of scenario versions and comprises override data (e.g., override data 510) that can comprise, or point to, scenario snapshot chains, as applicable. Value object 505 corresponds to a particular location (e.g., location A) in the hypercube (e.g., a particular account, organization level, region, etc.).

Override data 510 comprises the base snapshot chain for the base version or a pointer to the base snapshot chain. In the example shown, the base snapshot chain comprises first base snapshot 515.

Override data 510 may provide an index of scenario values that override base version values for the particular location. Override data 510 comprises, or points to, a base snapshot chain that comprises base version values for the corresponding location. Additionally, override data 510 comprises an indication of whether the corresponding location (e.g., location A) has a scenario value that overrides the base version value for a particular scenario version. For example, override data 510 comprises a set of override bits that are configured based on whether the set of scenario versions store override values for the corresponding location. In the example shown, the override bits are set at 10, which indicates that scenario 0 has an override value and scenario 1 does not have an override value. Additionally, or alternatively, override data 510 comprises scenario snapshot chains or a pointer to the scenario snapshot chains. In the example shown, because scenario 0 has an override value, override data 510 comprises the scenario 0 snapshot chain. Scenario 0 snapshot chain comprises first scenario 0 snapshot 520. Because scenario 1 does not have an override value for the corresponding location, override data 510 comprises a null pointer or other predefined placeholder.

Figure 5B:
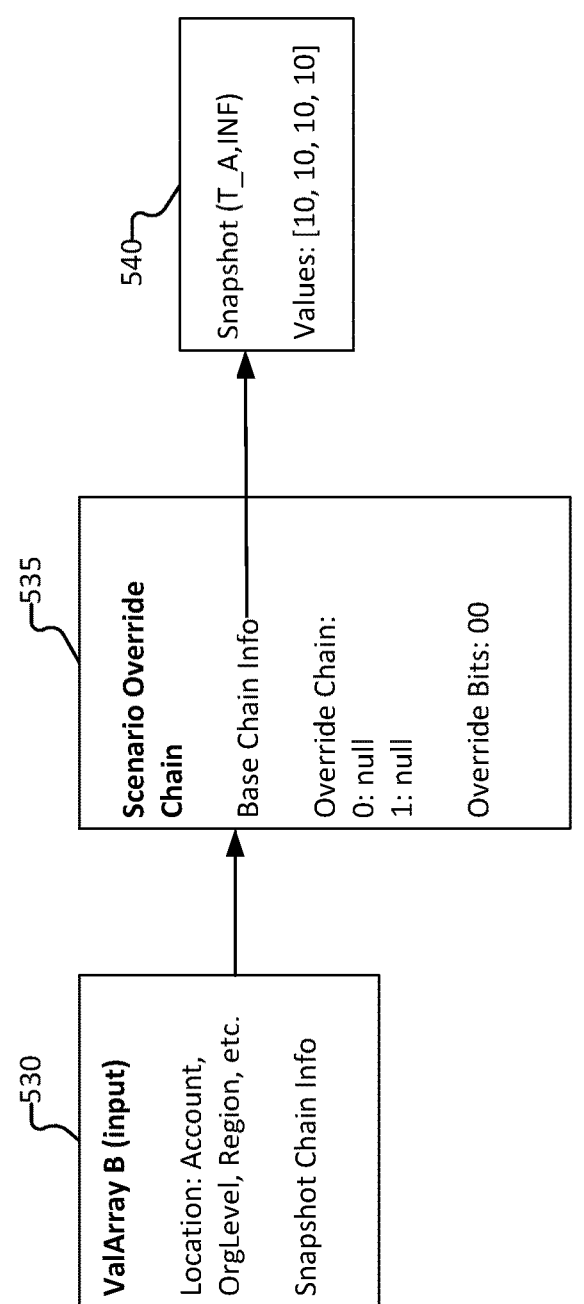
FIG. 5B illustrates an example of a data structure storing override data for hypercube location B according to various embodiments.

FIG. 5B illustrates an example of a data structure storing override data for hypercube location B according to various embodiments. In the example shown, hypercube location 525 comprises a data structure (e.g., value object 530) that indexes a plurality of scenario versions and comprises override data that can comprise, or point to, scenario snapshot chains, as applicable. Value object 530 corresponds to a particular location (e.g., location B) in the hypercube (e.g., a particular account, organization level, region, etc.). As illustrated, value object 530 comprises override data 535, which indicates that the corresponding location does not have a scenario override value. For example, both bits in the override bits are set to 0, which indicates that neither scenario 0 nor scenario 1 stores an override value at hypercube location 525. Value object 530 (e.g., override data 535) comprises a base snapshot chain or a pointer thereto. The base snapshot chain comprises first base snapshot 540.

Figure 5C:
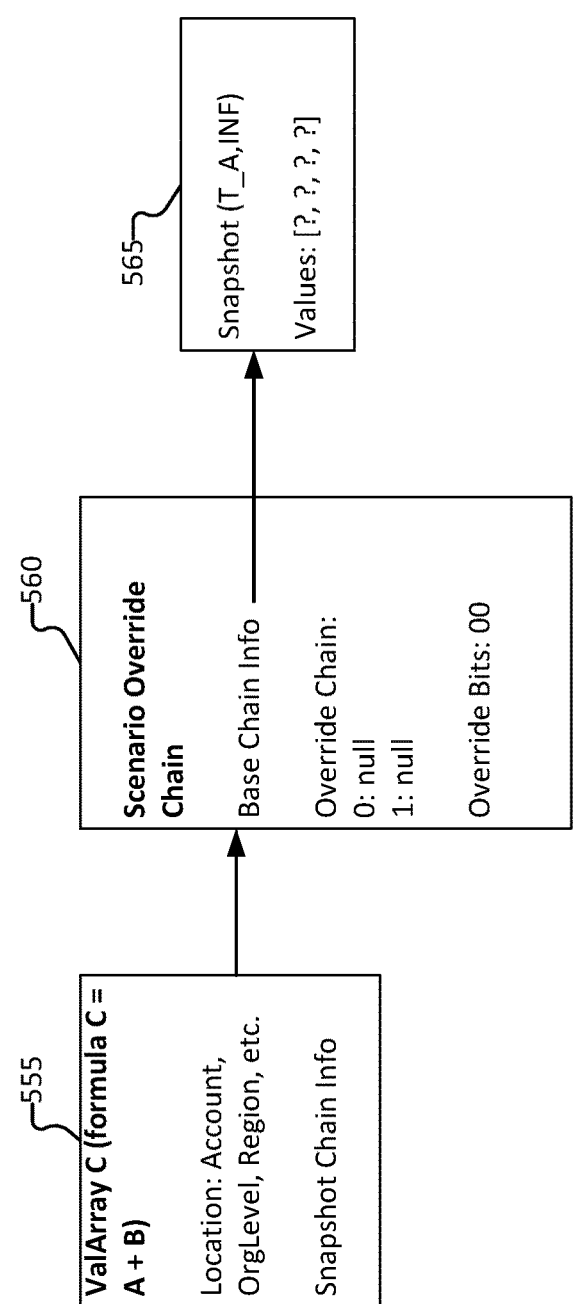
FIG. 5C illustrates an example of an initial state of a data structure storing override data for hypercube location C comprising a formula that depends on values from hypercube location A and hypercube location B according to various embodiments.

FIG. 5C illustrates an example of an initial state of a data structure storing override data for hypercube location C comprising a formula that depends on values from hypercube location A and hypercube location B according to various embodiments. In the example shown, hypercube location 550 comprises a formula. For example, value object 555 indicates that the formula is Account C=Account A+Account B, where Account A is equal to the value at hypercube location A (e.g., hypercube location 500) and Account B is equal to the value at hypercube location B (e.g., hypercube location 525). As illustrated, value object 555 comprises override data 560, which indicates that the corresponding location does not have a known scenario override value. Value object 555 (e.g., override data 560) comprises a base snapshot chain or a pointer thereto. The base snapshot chain comprises first base snapshot 565.

As illustrated, the values for first base snapshot 565 are set to "?", which indicates that the value has not been previously computed or that the previously computed value has been set to be invalid, such as in response to a change in a value on which the formula depends. In various other embodiments, other predefined symbols or null pointers can be used to denote that a value has not been previously computed/resolved.

In some embodiments, when a reading process determines to obtain the value at hypercube location 550 for the planning session, the reading process determines (e.g., based on the override bits configuration or lack of pointer to a scenario snapshot chain) that the value for hypercube location 550 is determined based on the base version value. The reading process determines whether the base version value has been previously computed, such as based on a flag or other indicator (e.g., the presence of "?" in the base snapshot chain or a null pointer for the base snapshot chain).

In the example shown, because the base version value has not been previously computed, the system has not yet determined whether hypercube location 550 has override values for any scenario versions. For example, the inputs to the locations on which the formula for hypercube location 550 depends may have scenario override values and because of the dependency on such locations, hypercube location 550 would correspondingly have scenario override values. For this reason, because the system has not yet computed the base version value and thus does not know whether a scenario override value exists for hypercube location 550, the override data 560 indicates that there is no override value. For example, both bits in the override bits are set to 0, which indicates that neither scenario 0 nor scenario 1 stores an override value at hypercube location 550.

If the reading process determines that the base version value has been previously computed (e.g., and that the base version value is still valid), the reading process obtains the base version value from memory. In contrast, if the reading process determines that the base version value has not been previously computed, the reading process obtains the values from which the base version value depends (e.g., the values for hypercube location A and hypercube location B in the example shown), computes the base version value according to the formula of hypercube location 550, and provides the base version value. In some embodiments, the reading process further stores the base version value in memory to enable other reading processes or planning sessions using other versions to obtain the base version value without re-computation (e.g., assuming the values on which the base version value depends remain valid).

Figure 5D:
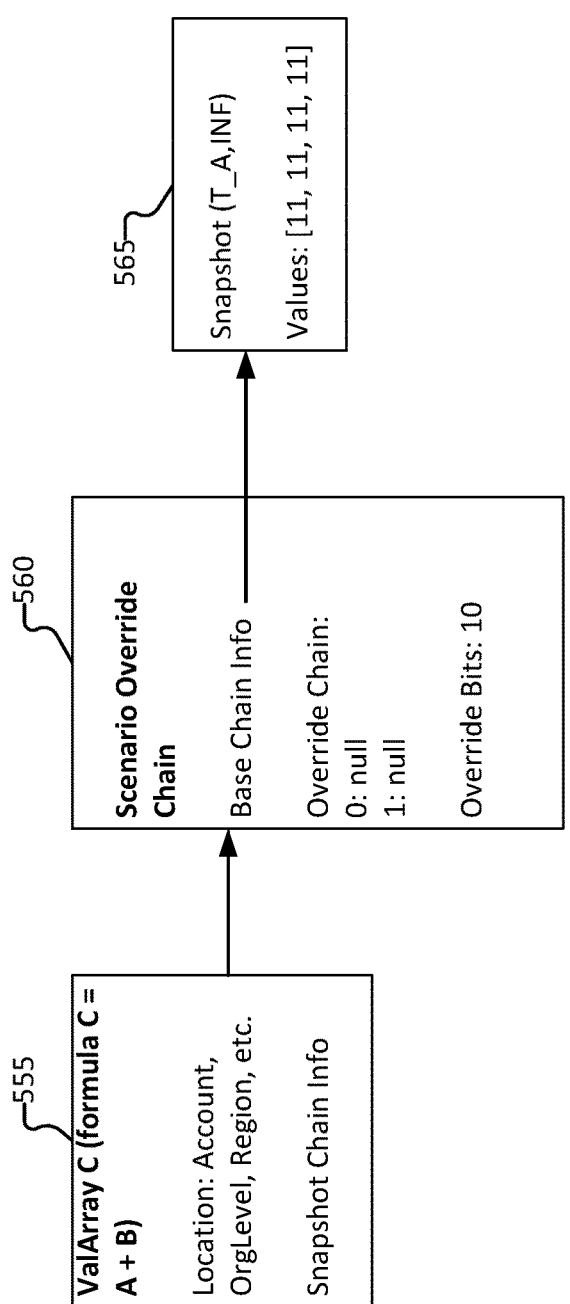
FIG. 5D illustrates an example of a data structure storing override data for hypercube location C comprising a formula after the formula has been evaluated according to various embodiments.

FIG. 5D illustrates an example of a data structure storing override data for hypercube location C comprising a formula after the formula has been evaluated according to various embodiments. Hypercube location 570 corresponds to hypercube location C as the reading process accessing hypercube location C resolves the formula in the base version and determines whether hypercube location C should have a scenario override value.

In the example shown, the reading process has computed the base version value for base snapshot 565 (e.g., the values comprise [11, 11, 11, 11] rather than a predefined character denoting that the formula had not been previously computed). As the base version value is computed, the data structures for hypercube location A and hypercube location B are accessed. Returning to FIGS. 5A and 5B, hypercube location A comprises a scenario override value for scenario 0 and hypercube location B does not comprise a scenario override value for either scenario 0 or scenario 1. Hypercube location A comprises override bits 10 and hypercube location B comprises override bits 00.

In some embodiments, the system (e.g., the reading process accessing hypercube location C) performs an OR function with respect to (i) whether hypercube location A comprises a scenario override value for any scenario version and (ii) whether hypercube location B comprises a scenario override value for any scenario version. For example, the system performs an OR function with respect to the override bits in override data 510 for hypercube location A and the override bits in override data 535 for hypercube location B (e.g., the system determines the result for the OR function with respect to 10 and 00, which is 10). The reading process may perform the OR function or otherwise determine whether the particular hypercube location (e.g., hypercube location C) being resolved should have a scenario override value as the reading process fetches the data for computing the base version value.

In response to performing the OR function with respect to whether the hypercube locations on which the particular hypercube location being resolved depends, the system stores an indication of whether the particular hypercube location has a scenario override value for any scenario version. As illustrated in FIG. 5D, for hypercube location C, the system stores in override data 560 an indication of whether any scenario has a scenario override value for the location. For example, the system configures the override bits (or sets another form of flag) to indicate that scenario 0 comprises a scenario override value and that scenario 1 does not comprise a scenario override value (e.g., the override bits are set to 10). Thus, the system has configured override data 560 in a manner such that the override data 560 indicates that the computed base version value is not valid for scenario 0 but is valid for scenario 1.

Figure 5E:
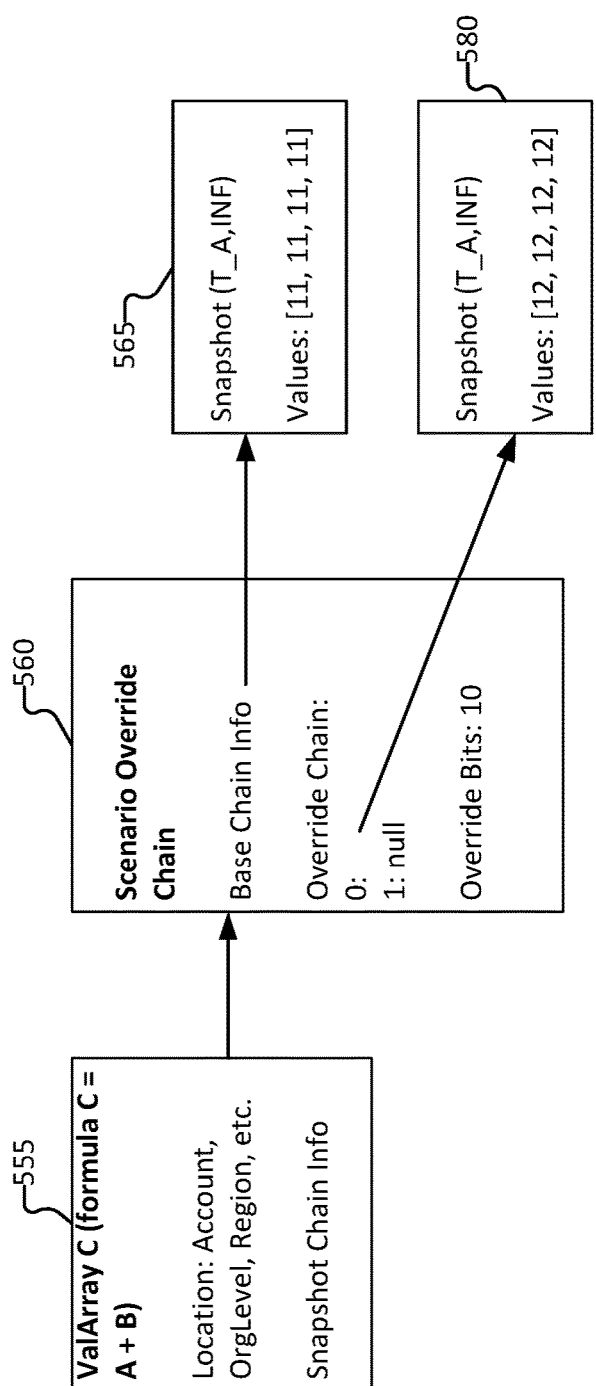
FIG. 5E illustrates an example of a data structure storing override data for hypercube location C comprising a formula after the formula has been evaluated according to various embodiments.

FIG. 5E illustrates an example of a data structure storing override data for hypercube location C comprising a formula after the formula has been evaluated according to various embodiments. A reading process operating in the base version could have first computed C. It would set the override bits to 10 since one of the terms of the formula has the 0th bit set. Later, a reading process operating in scenario 0 comes along and sees that the bit associated with scenario 0 has a positive value and would compute a scenario-specific value and populate the scenario chain. In other words, hypercube location 575 corresponds to hypercube location C as the reading process accessing hypercube location C resolves the formula in scenario 0 and determines that hypercube location C should have a scenario override value. In the example shown, hypercube location 575 corresponds to hypercube location C when a reading process for scenario 0 accesses hypercube location 575.

In response to the system configuring the override bits or other flag in override data 560 indicating whether any scenario stores a scenario version value, the override data 560 may still have null pointers (or other predefined characters) indicating that no scenario version value has been computed. However, because the reading process has determined that scenario 0 has a scenario override value at hypercube location C, the system can resolve the scenario version value and store the corresponding scenario snapshot/snapshot chain or a pointer thereto.

In the example shown, if the reading process corresponds to a reader for scenario 0, the reading process configures override data 560 to comprise (or point to) a scenario snapshot chain for scenario 0. For example, the override data 560 is configured to provide an override chain for scenario 0 by pointing to first scenario snapshot 580. In this example, the first scenario snapshot 580 corresponds to the resolved scenario value based on evaluating the formula for hypercube location C using the scenario override value for hypercube location A and the base version value for hypercube location B.

Figure 5F:
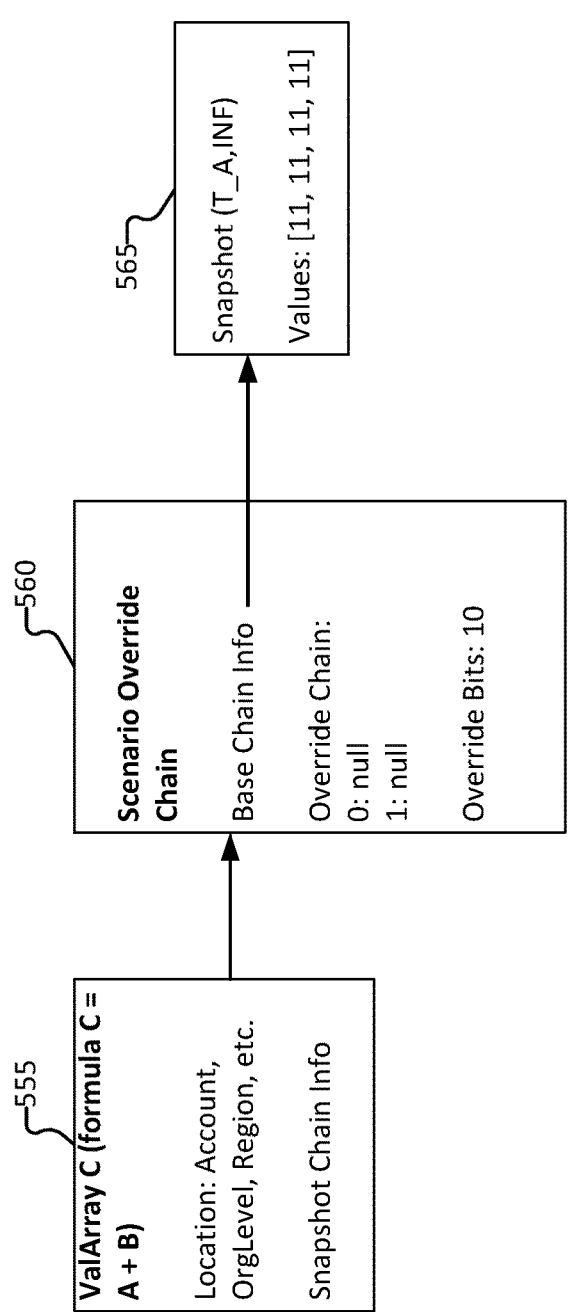
FIG. 5F illustrates a result for evaluating the value at hypercube location C for a scenario version for which no override data is stored for hypercube location C according to various embodiments.

FIG. 5F illustrates a result for evaluating the value at hypercube location C for a scenario version for which no override data is stored for hypercube location C according to various embodiments. Hypercube location 585 corresponds to hypercube location C as the reading process accessing hypercube location C resolves the formula in the base version and determines that hypercube location C should have a scenario override value. In the example shown, hypercube location 585 corresponds to hypercube location C when a reading process for scenario 1 accesses hypercube location 585.

In the example shown, if the reading process corresponds to a reader for scenario 1, the reading process determines that scenario 1 does not have a scenario override value for hypercube location C. For example, the reading process can query the override bits or other flag indicating whether an override value is to be used for the corresponding scenario version. Accordingly, the reading process fetches the applicable base version value (e.g., the base version value from the applicable base version snapshot (e.g., first base snapshot 565) in the base snapshot chain, such as based on the corresponding validity periods and the time associated with the reading process).

In some embodiments, as scenario versions are edited, the system propagates updates to the override bits or other flags indicating whether a scenario value is to be used at a particular hypercube location for the scenario version. The system can update the override bits or other flags for dependent computed value objects or other data structures.

In some embodiments, when a scenario version is instantiated (e.g., by the planning service for a planning session), the system updates the override bits or other flags indicating whether a scenario value is to be used at a particular hypercube location for the scenario version. For example, the system updates the override bits of dependent values for the previous edits in the scenario version.

Figure 6A:
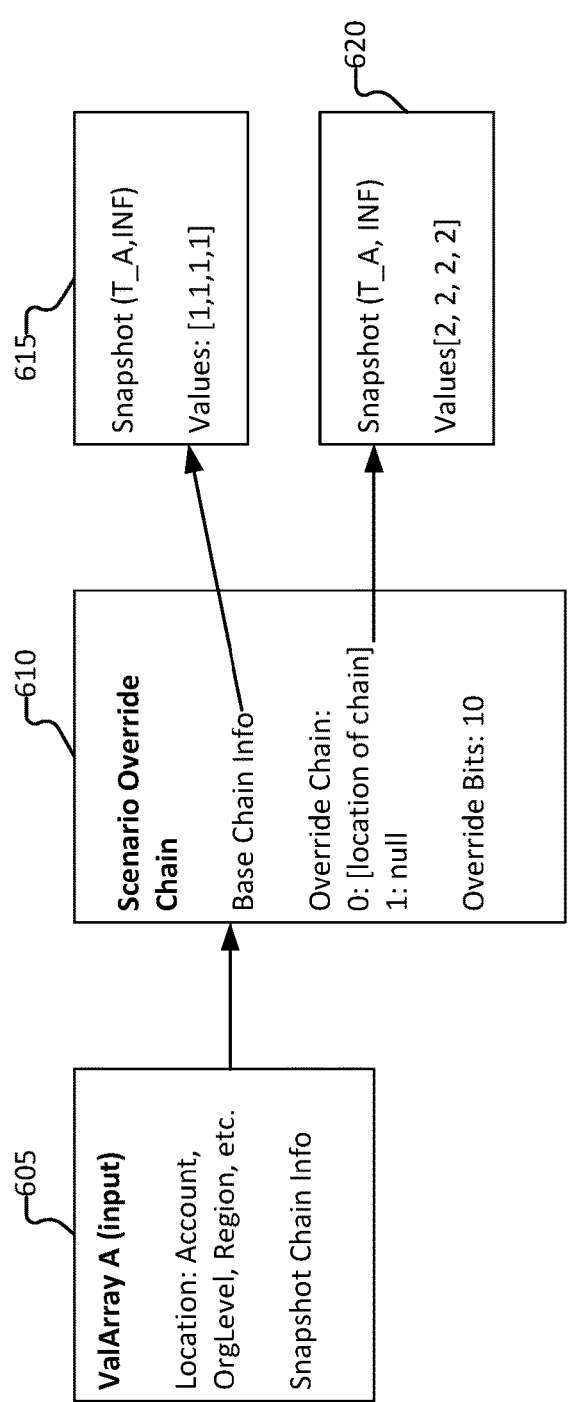
FIG. 6A illustrates an example of a data structure storing override data for hypercube location A according to various embodiments.

FIG. 6A illustrates an example of a data structure storing override data for hypercube location A according to various embodiments. In the example shown, hypercube location 600 comprises a data structure (e.g., value object 605) that indexes a plurality of scenario versions and comprises override data (e.g., override data 610) that can comprise, or point to, scenario snapshot chains, as applicable. Value object 605 corresponds to a particular location (e.g., location A) in the hypercube (e.g., a particular account, organization level, region, etc.).

As illustrated, override data 610 comprises a base snapshot chain or pointer thereto. The base snapshot chain includes first base snapshot 615 having a validity period of $(T_4, INF)$. Additionally, override data 610 comprises override chain data. The override chain data can indicate whether a particular scenario has a corresponding scenario override value. In the example shown, the override chain data comprises a scenario snapshot chain, or pointer thereto, for scenario 0. The scenario snapshot chain for scenario 0 includes first scenario snapshot 620 having a validity period of $(T_4, INF)$.

The override data 610 can comprise a set of override bits (e.g., a bit string) or other set of flags that indicate whether the scenario versions have corresponding scenario override values. In the example shown, the bit string comprised in override data 610 is set to 10, which indicates that scenario 0 has a corresponding scenario override value and scenario 1 does not have a corresponding override value (e.g., that the base version value is to be used for a reading process associated with scenario 1).

Figure 6B:
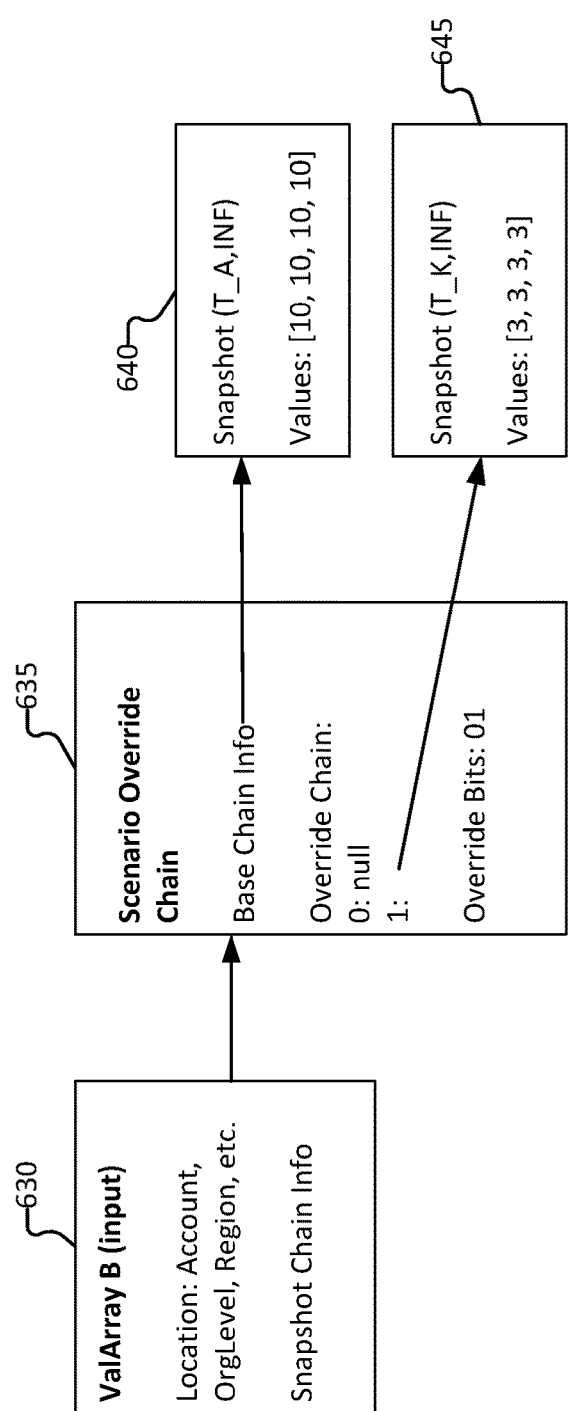
FIG. 6B illustrates an example of a data structure storing override data for hypercube location B after an edit to hypercube location B for scenario version 1 according to various embodiments.

FIG. 6B illustrates an example of a data structure storing override data for hypercube location B after an edit to hypercube location B for scenario version 1 according to various embodiments. In the example shown, hypercube location 625 comprises a data structure (e.g., value object 630) that indexes a plurality of scenario versions and comprises override data (e.g., override data 635) that can comprise, or point to, scenario snapshot chains, as applicable. Value object 630 corresponds to a particular location (e.g., location B) in the hypercube (e.g., a particular account, organization level, region, etc.).

As illustrated, override data 635 comprises a base snapshot chain or pointer thereto. The base snapshot chain includes first base snapshot 640 having a validity period of $(T_4, INF)$. Additionally, override data 635 comprises override chain data. In the example shown, the override chain data comprises a scenario snapshot chain, or pointer thereto, for scenario 1. The scenario snapshot chain for scenario 1 includes first scenario snapshot 645 having a validity period of ($T_K$, INF).

Override data 635 can comprise a set of override bits (e.g., a bit string) or other set of flags that indicate whether the scenario versions have corresponding scenario override values. In the example shown, the bit string comprised in override data 635 is set to 01, which indicates that scenario 1 has a corresponding scenario override value and scenario 0 does not have a corresponding override value (e.g., that the base version value is to be used for a reading process associated with scenario 0).

If hypercube location 625 did not comprise a scenario override value (e.g., if the override bits were set to 00 and override data 635 did not include any scenario snapshots) and hypercube location 625 is edited by a reading process for scenario 1 to add a scenario version value (e.g., a scenario override value corresponding to first scenario snapshot 645), the system can capture a scenario snapshot (e.g., first scenario snapshot 645) and correspondingly update override data 635. The updates to the override data 635 may include configuring the override bits/bit string or other flags to indicate that the hypercube location has a scenario override value for a particular scenario. Additionally, or alternatively, the updates to the override data 635 may include storing the scenario override value, such as storing the scenario snapshot chain for scenario 1 or a pointer to such scenario snapshot chain.

The start of the validity period for first scenario snapshot 645 is $T_K$, which indicates that the edit occurred at time $T_K$. Thus, the new scenario override value is valid from $T_K$ until a further edit is made to hypercube location C for scenario 1. For a scenario 1 reading process having an associated time earlier than $T_K$, the reading process would use the applicable base version value for scenario 1.

In some embodiments, in response to a change to a scenario version, such as an edit to add or update a scenario version value at a particular hypercube location, the system propagates the change, such as to values/locations that are dependent on the particular hypercube being updated.

Figure 6C:
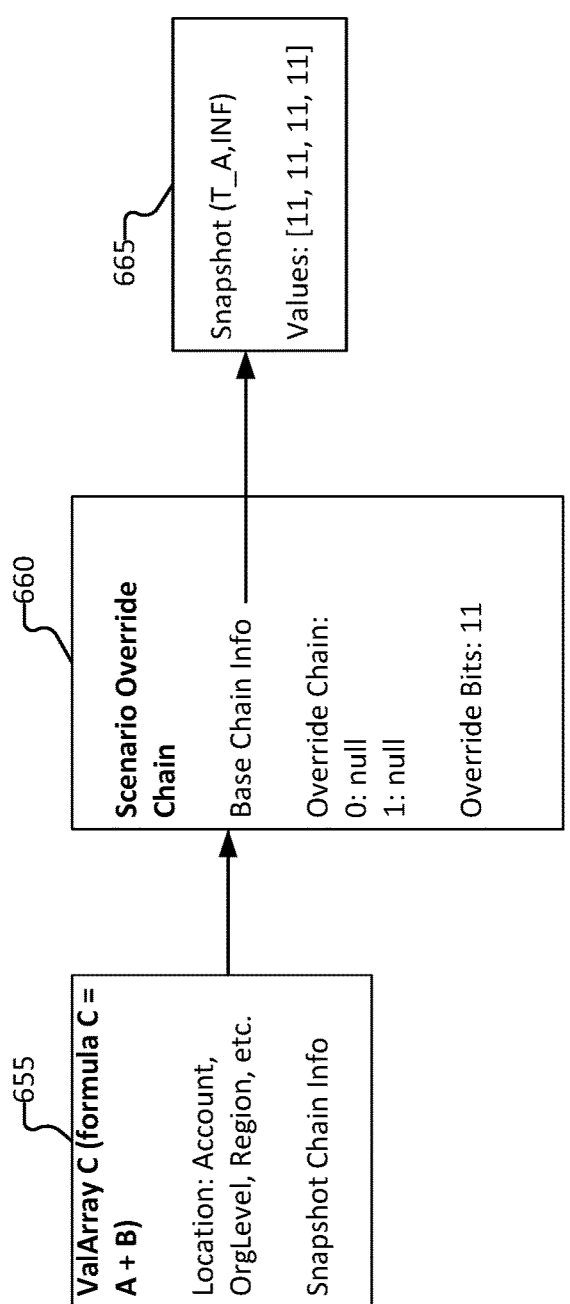
FIG. 6C illustrates an example of setting override indicators for a data structure storing override data for hypercube location C comprising a formula that depends on values from hypercube location A and hypercube location B according to various embodiments.

FIG. 6C illustrates an example of setting override indicators for a data structure storing override data for hypercube location C comprising a formula that depends on values from hypercube location A and hypercube location B according to various embodiments. In the example shown, hypercube location 650 comprises a formula. For example, value object 655 indicates that the formula is Account C=Account A+Account B, where Account A is equal to the value at hypercube location A (e.g., hypercube location 600) and Account B is equal to the value at hypercube location B (e.g., hypercube location 625).

Before the edit to hypercube location B for scenario 1 (e.g., to add a scenario override value), as described in the example above, override data 635 does not comprise a scenario snapshot chain for either scenario 0 or scenario 1 and the override bits are configured to 10 to indicate that the hypercube location C has a scenario override value for scenario 0 and that the base version value is to be used for scenario 1 (e.g., by a reading process for scenario 1). In some embodiments, to propagate the edit to hypercube location B to hypercube location C (e.g., which is dependent on the value at hypercube location B based on the use of the hypercube location B value in its formula), the system can configure the override bits or other flag to indicate that hypercube location C has a scenario override value for scenario 1. For example, as illustrated in FIG. 6C, override data 660 is updated to configure the override bits to 11, indicating that hypercube location C has scenario override values for both scenario 0 and scenario 1.

In the example shown, the override data 660 comprises null pointers rather than pointers to corresponding scenario snapshot chains because the value for hypercube location C has not yet been obtained by a reading process for scenario 0 or scenario 1 and thus the scenario override values have not been evaluated for either scenario 0 or scenario 1. Additionally, override data 660 comprises a pointer to first base snapshot 665.

Figure 7:
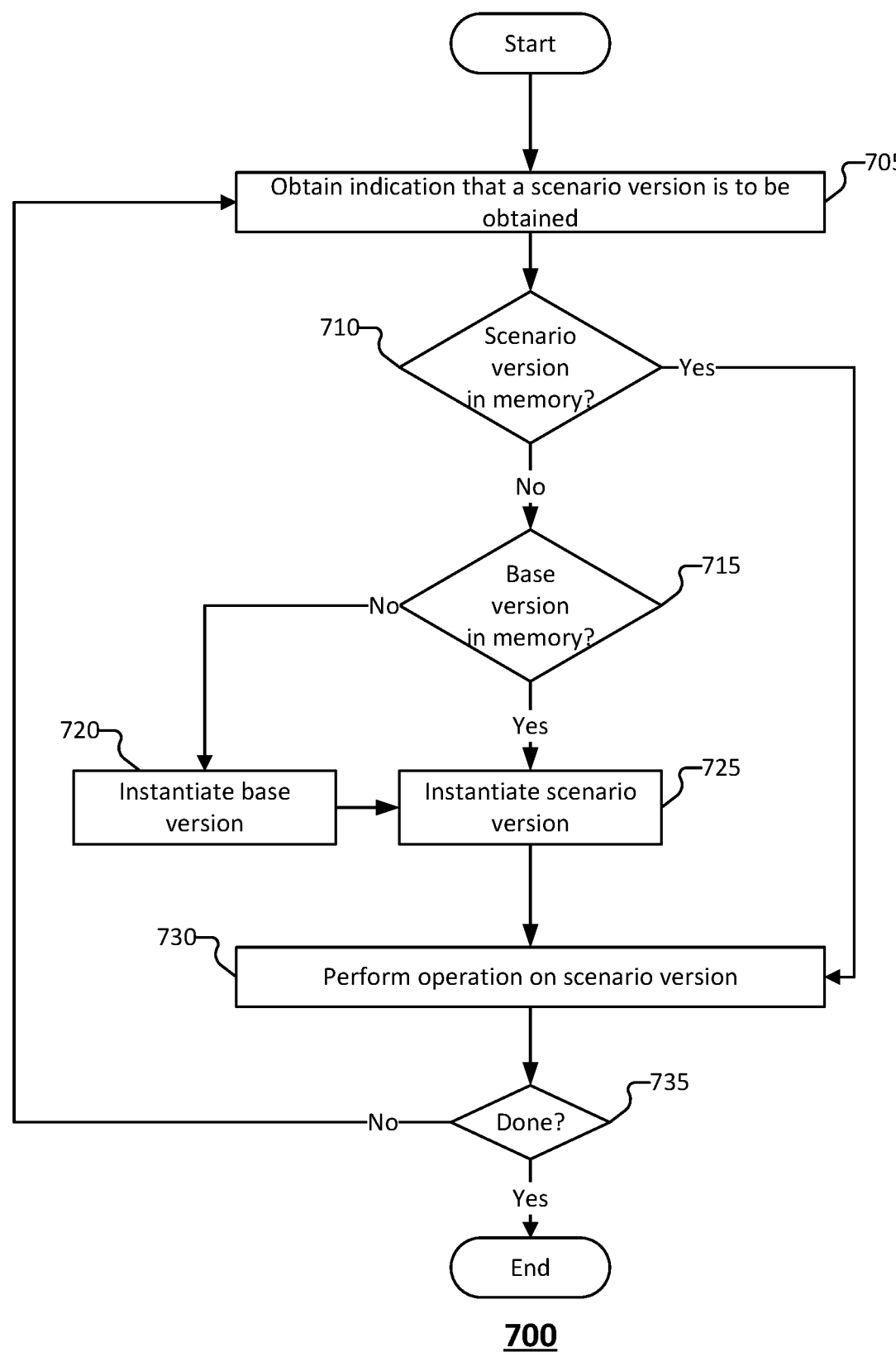
FIG. 7 is a flow diagram of a method for providing a scenario version according to various embodiments of the present application.

FIG. 7 is a flow diagram of a method for providing a scenario version according to various embodiments of the present application. In some embodiments, process 700 is implemented by system 100 of FIG. 1 and/or system 200 of FIG. 2.

At 705, the system obtains an indication that a scenario version is to be obtained. In some embodiments, the system determines to obtain the scenario version based at least in part on a request for a planning service. For example, the request for a planning service comprises a context version identifier, which identifies the version of the hypercube to be used for the planning service. The system can use the context version identifier to determine that the planning service is to use a particular scenario version (e.g., the system queries a mapping of context version identifiers to hypercube versions). At 710, the system determines whether the scenario version is in memory. In response to determining that the scenario version is not in memory at 710, process 700 proceeds to 715 at which the system determines whether the corresponding base version is in memory. In response to determining that the base version is not in memory, process 700 proceeds to 720 at which the system instantiates the base version. Process 700 then proceeds to 725. Conversely, in response to determining that the base version is in memory at 715, process 700 proceeds to 725. At 725, the system instantiates the scenario version and process 700 proceeds to 730. In response to determining that the scenario version is in memory at 710, process 700 proceeds to 730. At 730, the system performs an operation on the scenario version. For example, the system provides the scenario version (e.g., in connection with a planning service) and performs operations, such as edits or updates, based on user input.

At 735, a determination is made as to whether process 700 is complete. In some embodiments, process 700 is determined to be complete in response to a determination that no further planning sessions are to be provided, no further hypercube versions are to be provided or obtained, no further values in the hypercube are to be obtained, no further reading processes exist, a user has exited the system, an administrator indicates that process 700 is to be paused or stopped, etc. In response to a determination that process 700 is complete, process 700 ends. In response to a determination that process 700 is not complete, process 700 returns to 705.

Figure 8:
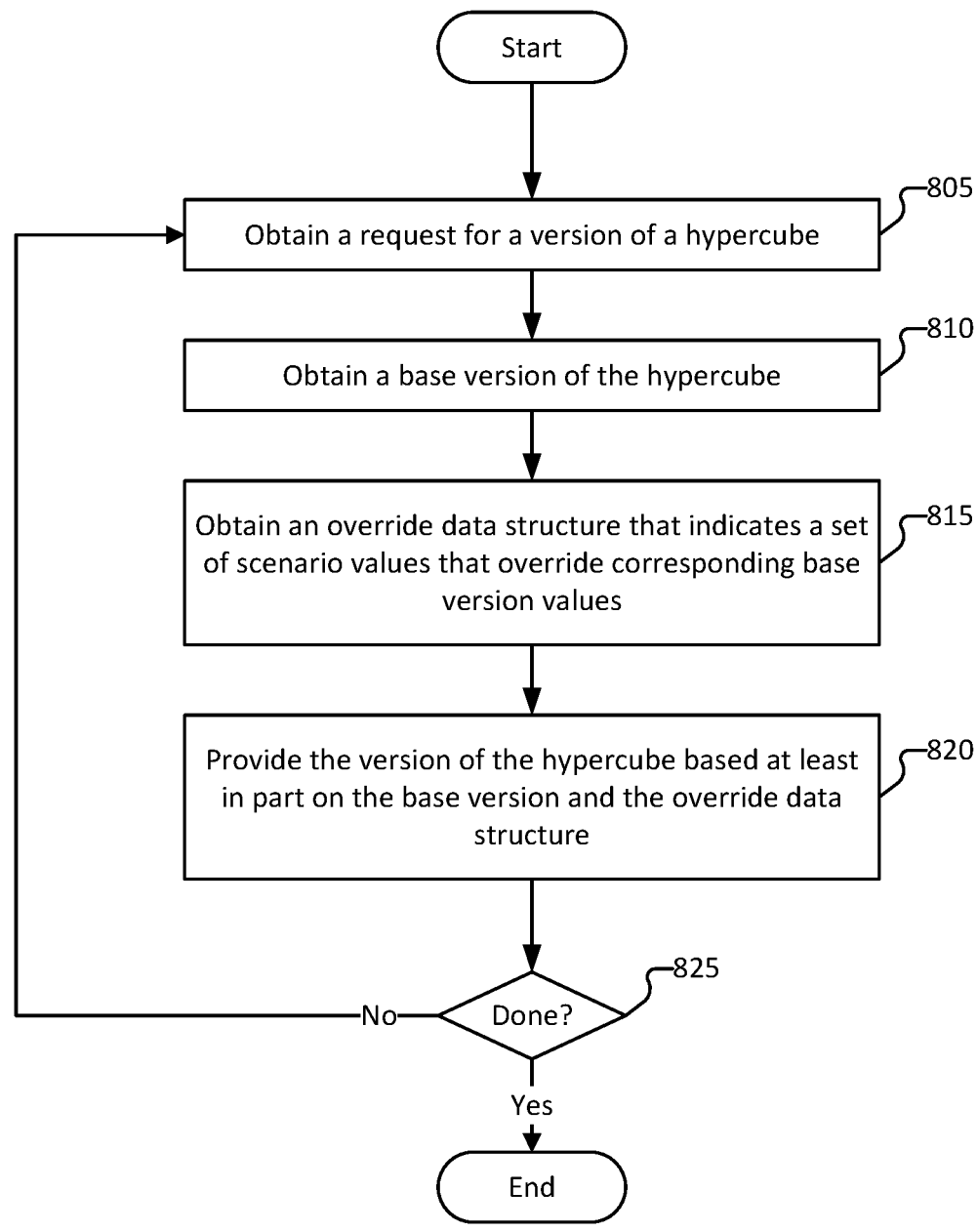
FIG. 8 is a flow diagram of a method for providing a version of a hypercube in response to a request for a planning session according to various embodiments.

FIG. 8 is a flow diagram of a method for providing a version of a hypercube in response to a request for a planning session according to various embodiments. In some embodiments, process 800 is implemented by system 100 of FIG. 1 and/or system 200 of FIG. 2.

At 805, the system obtains a request for a version of a hypercube. At 810, the system obtains a base version of the hypercube. At 815, the system obtains an override data structure that indicates a set of scenario values that override corresponding base version values. At 820, the system provides the version of the hypercube based at least in part on the base version and the override data structure. At 825, a determination is made as to whether process 800 is complete. In some embodiments, process 800 is determined to be complete in response to a determination that no further planning sessions are to be provided, no further hypercube versions are to be provided or obtained, no further values in the hypercube are to be obtained, no further reading pro- cesses exist, a user has exited the system, an administrator indicates that process 800 is to be paused or stopped, etc. In response to a determination that process 800 is complete, process 800 ends. In response to a determination that process 800 is not complete, process 800 returns to 805.

Figure 9:
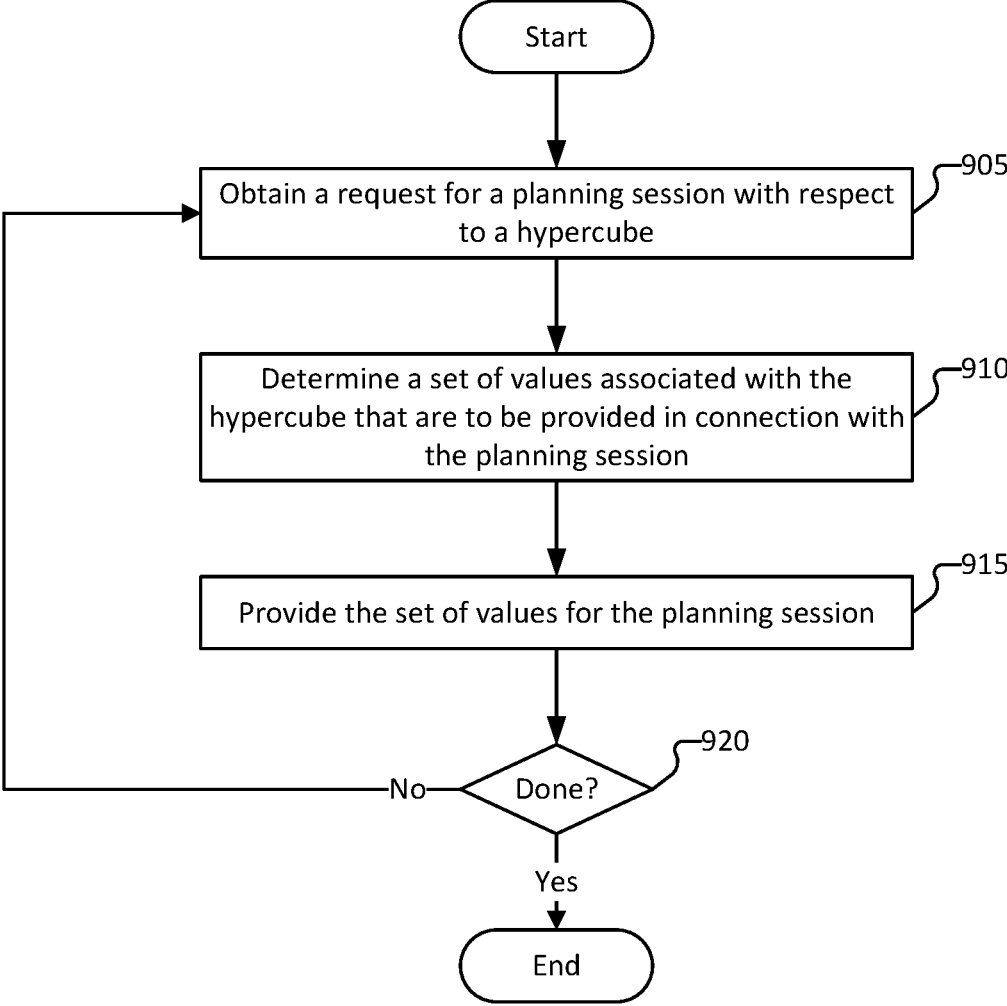
FIG. 9 is a flow diagram of a method for providing a version of a hypercube for a planning session according to various embodiments.

FIG. 9 is a flow diagram of a method for providing a version of a hypercube for a planning session according to various embodiments. In some embodiments, process 900 is implemented by system 100 of FIG. 1 and/or system 200 of FIG. 2.

At 905, the system obtains a request for a planning session with respect to a hypercube. At 910, the system determines a set of values associated with the hypercube that are to be provided in connection with the planning session. At 915, the system provides the set of values for the planning session. At 920, a determination is made as to whether process 900 is complete. In some embodiments, process 900 is determined to be complete in response to a determination that no further planning sessions are to be provided, no further hypercube versions are to be provided or obtained, no further values in the hypercube are to be obtained, no further reading processes exist, a user has exited the system, an administrator indicates that process 900 is to be paused or stopped, etc. In response to a determination that process 900 is complete, process 900 ends. In response to a determina- tion that process 900 is not complete, process 900 returns to 905.

Figure 10:
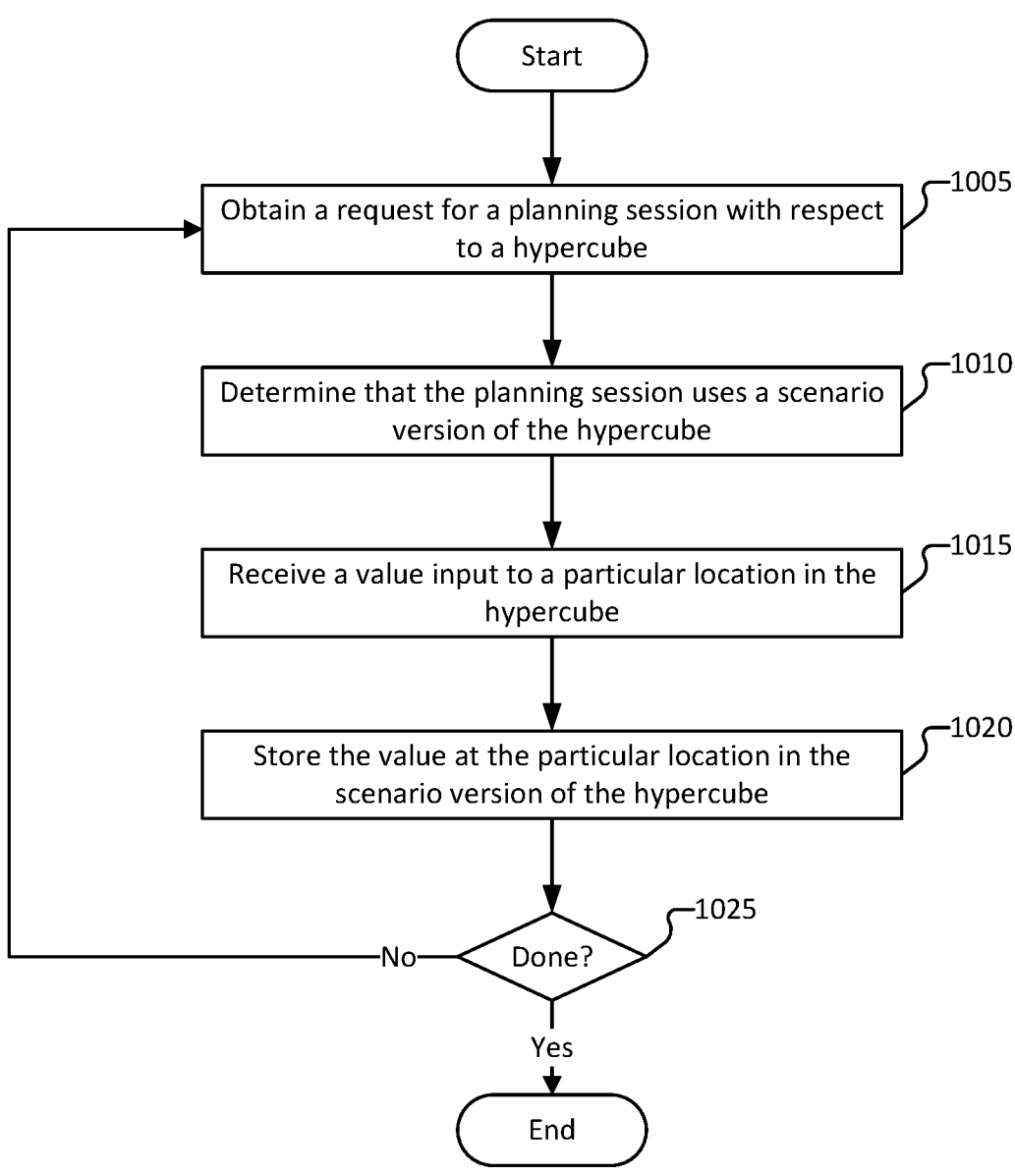
FIG. 10 is a flow diagram of a method for storing an edit to a scenario version of a hypercube according to various embodiments.

FIG. 10 is a flow diagram of a method for storing an edit to a scenario version of a hypercube according to various embodiments. In some embodiments, process 1000 is imple- mented by system 100 of FIG. 1 and/or system 200 of FIG. 2.

At 1005, the system obtains a request for a planning session with respect to a hypercube. At 1010, the system determines that the planning session uses a scenario version of the hypercube. At 1015, the system receives a value input to a particular location in the hypercube. At 1020, the system stores the value at the particular location in the scenario version of the hypercube. At 1025, a determination is made as to whether process 1000 is complete. In some embodi- ments, process 1000 is determined to be complete in response to a determination that no further planning sessions are to be provided, no further hypercube versions are to be provided or obtained, no further values in the hypercube are to be obtained, no further values in the hypercube version are to be updated, no further reading processes exist, a user has exited the system, an administrator indicates that process 1000 is to be paused or stopped, etc. In response to a determination that process 1000 is complete, process 1000 ends. In response to a determination that process 1000 is not complete, process 1000 returns to 1005.

Figure 11:
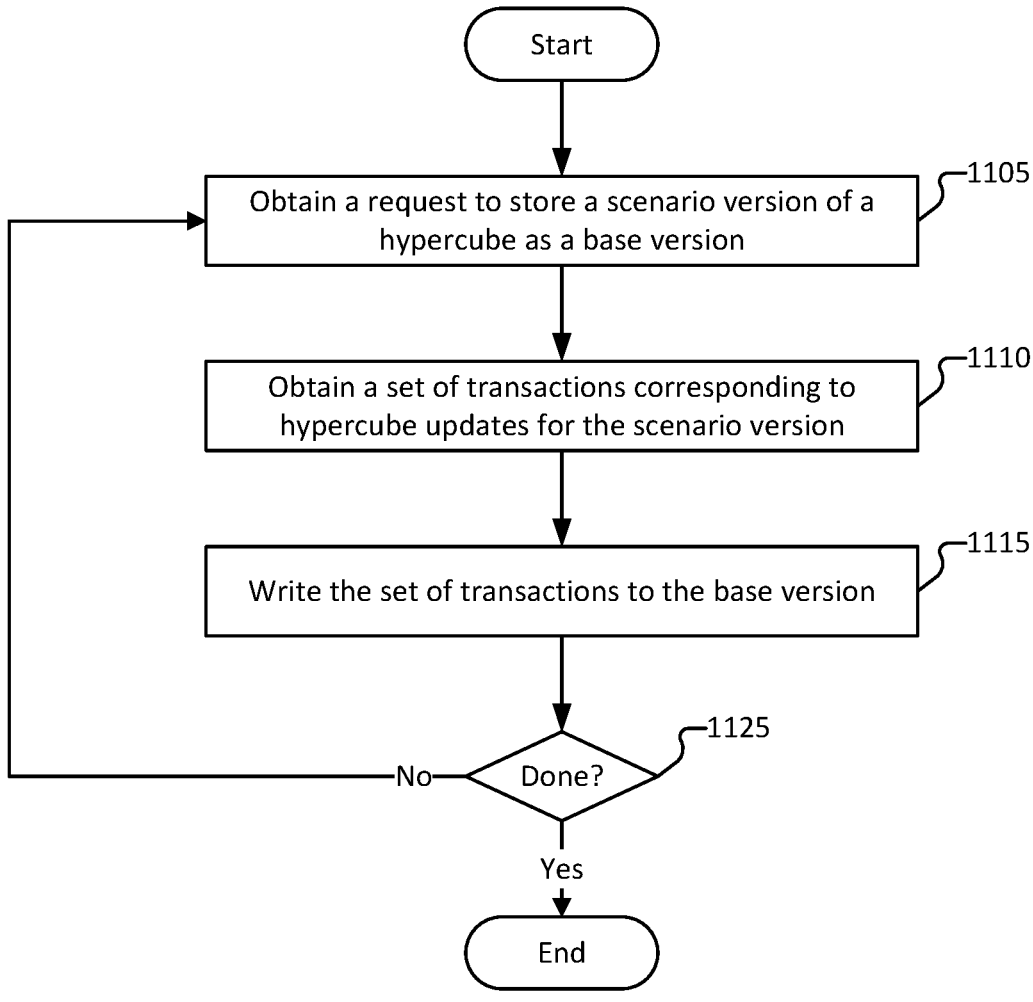
FIG. 11 is a flow diagram of a method for setting a current scenario version as a base version of a hypercube according to various embodiments.

FIG. 11 is a flow diagram of a method for setting a current scenario version as a base version of a hypercube according to various embodiments. In some embodiments, process 1100 is implemented by system 100 of FIG. 1 and/or system 200 of FIG. 2.

At 1105, the system obtains a request to store a scenario version of a hypercube as a base version. At 1110, the system obtains a set of transactions corresponding to hypercube updates for the scenario version. At 1115, the system writes set of transactions to the base version. The system propa- gates changes made by setting a scenario version to other instantiations of base versions and other scenario versions having a dependency on the base version. At 1125, a determination is made as to whether process 1100 is com- plete. In some embodiments, process 1100 is determined to be complete in response to a determination that no further planning sessions are to be provided, no further writes are to be made with respect to the base version, no further hyper- cube versions are to be provided or obtained, no further values in the hypercube are to be obtained, no further reading processes exist, a user has exited the system, an administrator indicates that process 1100 is to be paused or stopped, etc. In response to a determination that process 1100 is complete, process 1100 ends. In response to a determination that process 1100 is not complete, process 1100 returns to 1105.

Figure 12:
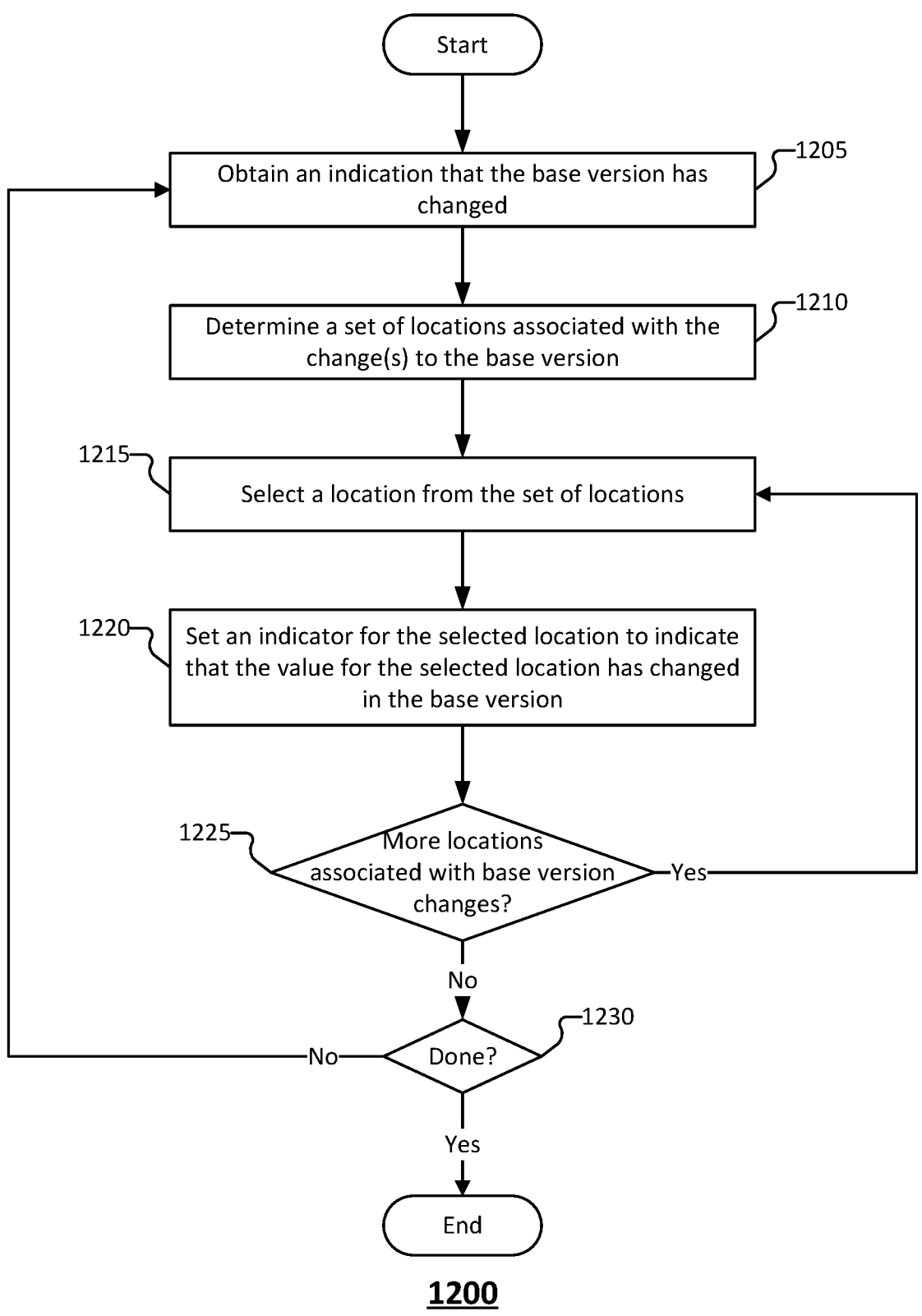
FIG. 12 is a flow diagram of a method for propagating base version changes to a scenario version according to various embodiments.

FIG. 12 is a flow diagram of a method for propagating base version changes to a scenario version according to various embodiments. In some embodiments, process 1200 is implemented by system 100 of FIG. 1 and/or system 200 of FIG. 2.

At 1205, the system obtains an indication that the base version has changed. At 1210, the system determines a set of locations associated with the change(s) to the base version. At 1215, the system selects a location from the set of locations. At 1220, the system sets an indicator for the selected location to indicate that the value for the selected location has changed in the base version. At 1225, the system determines whether more locations in the base version of the hypercube have associated base version changes (e.g., changes to be propagated to other locations in the base version or scenario versions having a dependency on the base version). In response to determining that addi- tional locations in the base version of the hypercube have associated base version changes, process 1200 returns to 1215 and the process iterates over 1215-1225 until no further locations of the base version have associated base version changes (e.g., no further locations have base version changes to be propagated). Conversely, in response to deter- mining that no further locations of the base version have associated base version changes (e.g., no further locations have base version changes to be propagated), process 1200 proceeds to 1230. At 1230, a determination is made as to whether process 1200 is complete. In some embodiments, process 1200 is determined to be complete in response to a determination that no further planning sessions are to be provided, no further writes are to be made with respect to the base version, no further hypercube versions are to be pro- vided or obtained, no further values in the hypercube are to be obtained, no further changes are to be propagated, no further reading processes exist, a user has exited the system, an administrator indicates that process 1200 is to be paused or stopped, etc. In response to a determination that process 1200 is complete, process 1200 ends. In response to a determination that process 1200 is not complete, process 1200 returns to 1205.

Although the above example describes the propagation of changes to other dependent locations in the base version, similar propagation may be implemented with respect to locations in scenario versions that depend on a base version location being changed.

Figure 13:
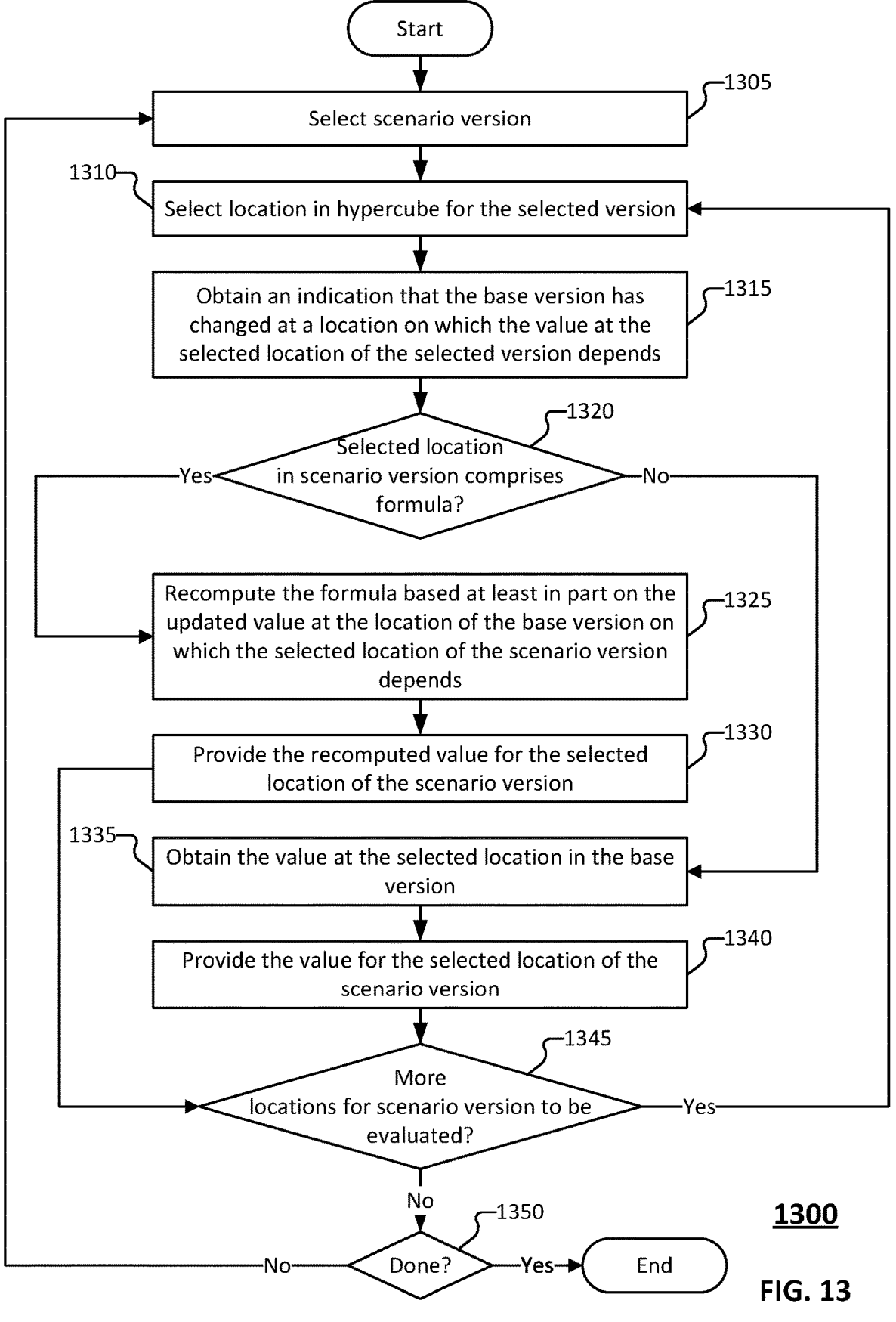
FIG. 13 is a flow diagram of a method for providing a scenario version according to various embodiments.

FIG. 13 is a flow diagram of a method for providing a scenario version according to various embodiments. In some embodiments, process 1300 is implemented by system 100 of FIG. 1 and/or system 200 of FIG. 2.

At 1305, the system selects a scenario version.

At 1310, the system selects a location in the hypercube for the selected version.

At 1315, the system obtains an indication that the base version has changed at a location on which the value at the selected location of the selected version depends.

At 1320, the system determines whether the selected location in the scenario version comprises a formula.

In response to determining that the selected location in the scenario version comprises a formula, process 1300 proceeds to 1325. At 1325, the system recomputes the formula based at least in part on the updated value at the location of the base version on which the selected location of the scenario version depends. For example, the system obtains the corresponding values on which the selected location of the scenario version depends (e.g., the system obtains the appropriate snapshots for such values, such as based on a time associated with a reading process for which the scenario version is being used) and the system recomputes the value for the selected location. At 1330, the system provides the recomputed value for the selected location of the scenario version. Process 1300 then proceeds to 1345.

In response to determining that the selected location in the scenario version does not comprise a formula, process 1300 proceeds to 1335. At 1335, the system obtains the value at the selected location in the base version. At 1340, the system provides the value for the selected location of the scenario version. Process 1300 then proceeds to 1345.

At 1345, the system determines whether another location(s) for the scenario version is to be evaluated. For example, the system determines whether another location of the scenario version depends on a base version value that has changed (e.g., thereby causing a previous evaluation of the location of the scenario version to become invalidated). In response to determining that another location(s) for the scenario version is to be evaluated, process 1300 returns to 1310 and process 1300 iterates over 1310-1345 until no further locations of the scenario version are to be evaluated. Conversely, in response to determining that no further locations of the scenario version are to be evaluated, process 1300 proceeds to 1350.

At 1350, a determination is made as to whether process 1300 is complete. In some embodiments, process 1300 is determined to be complete in response to a determination that no further planning sessions are to be provided, no further scenario versions are to be provided or evaluated, no further changes are to be propagated, no further reading processes exist, a user has exited the system, an administrator indicates that process 1300 is to be paused or stopped, etc. In response to a determination that process 1300 is complete, process 1300 ends. In response to a determination that process 1300 is not complete, process 1300 returns to 1305.

Figure 14:
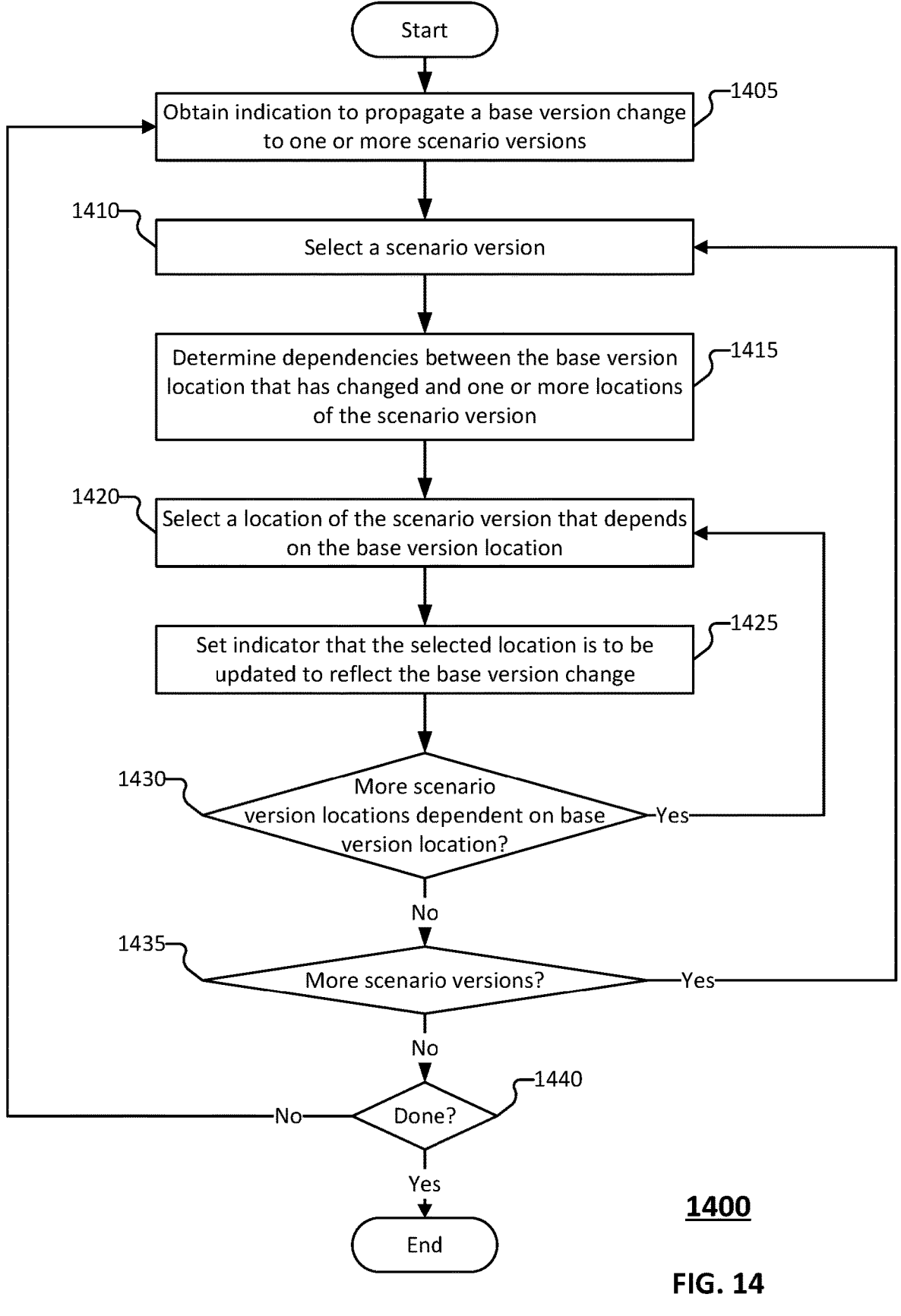
FIG. 14 is a flow diagram of a method for propagating base version changes to one or more scenario versions according to various embodiments.

FIG. 14 is a flow diagram of a method for propagating base version changes to one or more scenario versions according to various embodiments. In some embodiments, process 1400 is implemented by system 100 of FIG. 1 and/or system 200 of FIG. 2.

At 1405, the system obtains an indication to propagate a base version change to one or more scenario versions. The system may obtain the indication based on an indicator being set upon a change to the base version. Alternatively, the system may obtain the indication upon evaluation of the scenario versions dependent on the location of the base version being changed. For example, the system determines that the base version has changed for a dependent location in a scenario version when a reading process attempts to obtain the value for the scenario version at the dependent location (e.g., the most recent snapshot may be invalidated thereby requiring a new snapshot to be captured after evaluating the value based on the base version change).

At 1410, the system selects a scenario version.

At 1415, the system determines dependencies between the base version location that has changed and one or more locations of the selected scenario version.

At 1420, the system selects a location of the selected version that depends on the base version location.

At 1425, the system selects an indicator that the selected location is to be updated to reflect the base version location.

At system 1430, the system determines whether another scenario location is dependent on the base version location. In response to determining that another scenario location(s) is dependent on the base version location, process 1400 returns to 1420 and process 1400 iterates over 1420-1430 until no further indicators for scenario locations dependent on the base version are to be configured. In response to determining that no further indicators for scenario locations dependent on the base version are to be configured, process 1400 proceeds to 1435.

At 1435, the system determines whether another scenario version depends on the base version. For example, the system determines whether the base version change is to be propagated to another scenario version that is dependent on the base version. In response to determining that another scenario version depends on the base version, process 1400 returns to 1410 and process 1400 iterates over 1410-1435 until the system determines that no further indicators for scenario versions dependent on the base version are to be configured. In response to determining that no further indicators for scenario versions dependent on the base version are to be configured, process 1400 proceeds to 1440.

At 1440, a determination is made as to whether process 1400 is complete. In some embodiments, process 1400 is determined to be complete in response to a determination that no further planning sessions are to be provided, no further scenario versions are to be provided or evaluated, no further changes are to be propagated (e.g., no further base version changes are to be propagated to scenario version(s) having a dependency on the base version), no further reading processes exist, a user has exited the system, an administrator indicates that process 1400 is to be paused or stopped, etc. In response to a determination that process 1400 is complete, process 1400 ends. In response to a determination that process 1400 is not complete, process 1400 returns to 1405.

Figure 15:
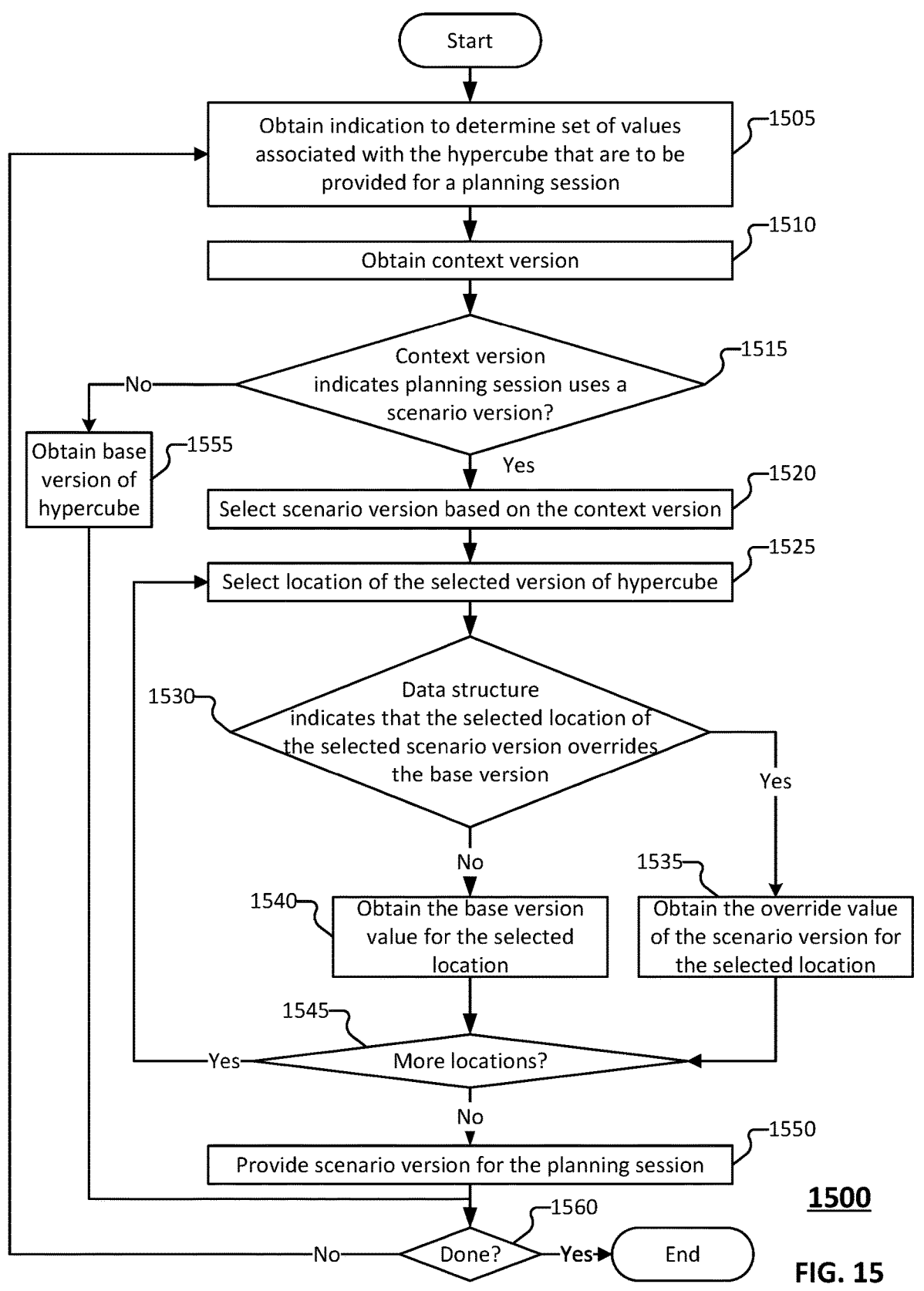
FIG. 15 is a flow diagram of a method for providing a hypercube version for a planning session according to various embodiments.

FIG. 15 is a flow diagram of a method for providing a hypercube version for a planning session according to various embodiments. In some embodiments, process 1500 is implemented by system 100 of FIG. 1 and/or system 200 of FIG. 2.

At 1505, the system obtains an indication to determine a set of values associated with the hypercube that are to be provided for a planning session.

At 1510, the system obtains a context version. For example, the system obtains a context version identifier associated with the version to be provided in the planning session. The context version identifier may be comprised in a request to start or load a planning session.

At 1515, the system determines whether the context version indicates that the planning session uses a scenario version. For example, the system determines whether the context version identifier corresponds to a base version or a scenario version. The system may determine whether the context version identifier corresponds to a base version, or a scenario version based on querying a mapping of context version identifiers to version information for a corresponding hypercube version. In response to determining that the context version indicates that the planning session uses a scenario version, process 1500 proceeds to 1520. Conversely, in response to determining that the context version indicates that the planning session does not use a scenario version (e.g., the system determines that the context version corresponds to the base version), process 1500 proceeds to 1555.

At 1520, the system selects a scenario version based at least in part on the context version. For example, the system determines the scenario version corresponding to the context version identifier.

At 1525, the system selects a location of the selected version of the hypercube.

At 1530, the system determines whether a data structure indicates that the selected location of the selected scenario version overrides the base version. The data structure may be associated with the selected location of the hypercube and may store information pertaining to the value at that particular location across a plurality of versions (e.g., a base version and one or more scenario versions). For example, each location in the hypercube may have a corresponding data structure comprising override data.

In some embodiments, the data structure stores snapshot chains for the various associated hypercubes, or pointers to such snapshot chains. The system can use the data structure to identify the applicable snapshot to be used in providing the requested hypercube version for the planning session. For example, the system determines a time associated with a reading process for the planning session and determines for the applicable hypercube version the snapshot chain having a validity period that intersects with the reading process time (e.g., a timestamp of the reading process).

In response to determining that the data structure indicates that the selected location of the selected scenario version overrides the base version (e.g., that the scenario version has an input value to the selected location), process 1500 proceeds to 1535 at which the system obtains the override value of the scenario version for the selected location. For example, the system obtains the override value from the applicable snapshot of the scenario version (e.g., the snapshot in the scenario version snapshot chain that has a matching time).

In response to determining that the data structure indicates that the selected location of the selected scenario version does not override the base version (e.g., that the scenario version does not have a value to the selected location that is intended to override the base version value for the selected location), process 1500 proceeds to 1540 at which the system obtains the base version value for the selected location.

At 1545, the system determines whether another location for the selected scenario version is to be evaluated. In response to determining that another location is to be evaluated, process 1500 returns to 1525 and process 1500 iterates over 1525-1545 until no further locations are to be evaluated. Conversely, in response to determining that no further locations are to be evaluated for the selected scenario version, process 1500 proceeds to 1550.

At 1550, the system provides the scenario version for the planning session.

At 1555, the system obtains (and provides) the base version of the hypercube.

At 1560, a determination is made as to whether process 1500 is complete. In some embodiments, process 1500 is determined to be complete in response to a determination that no further planning sessions are to be provided, no further scenario versions are to be provided or evaluated, no further reading processes exist, a user has exited the system, an administrator indicates that process 1500 is to be paused or stopped, etc. In response to a determination that process 1500 is complete, process 1500 ends. In response to a determination that process 1500 is not complete, process 1500 returns to 1505.

Figure 16:
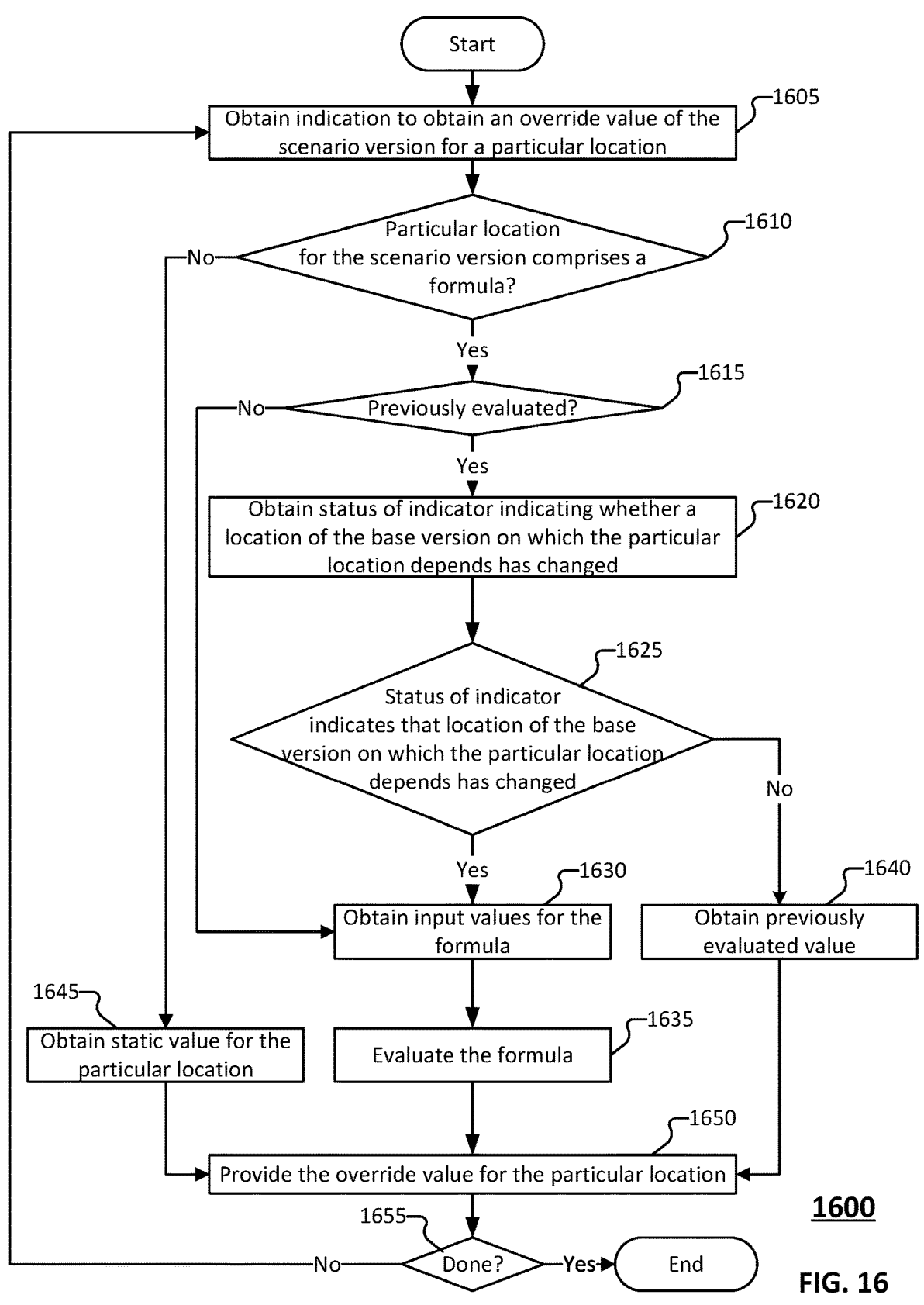
FIG. 16 is a flow diagram of a method for obtaining an override value of a scenario version for a particular hypercube location according to various embodiments.

FIG. 16 is a flow diagram of a method for obtaining an override value of a scenario version for a particular hypercube location according to various embodiments. In some embodiments, process 1600 is implemented by system 100 of FIG. 1 and/or system 200 of FIG. 2.

At 1605, the system obtains an indication to obtain an override value of the scenario version for a particular location. For example, the system obtains the indication in connection with the instantiating/loading of a hypercube version for a planning session.

At 1610, the system determines whether the particular location for the scenario version comprises a formula. For example, the system determines whether the particular location comprises a static input value, a formula that is dependent on another location in the scenario version and/or base version, or the value stored at the corresponding location in the base version (e.g., that the scenario version does not store an override value for the particular location). In response to determining that the particular location for the scenario version comprises a formula, process 1600 proceeds to 1615. Conversely, in response to determining that the particular location for the scenario version does not comprise a formula, process 1600 proceeds to 1645.

At 1615, the system determines whether the formula at the particular location has been previously evaluated. For example, to avoid incurring resources to re-evaluate the formula, the system can use the resulting value from the previous evaluation (e.g., provided that the previous evaluation is still valid). In response to determining that the formula at the particular location has been previously evaluated, process 1600 proceeds to 1620. Conversely, in response to determining that the formula at the particular location has not been previously evaluated, process 1600 proceeds to 1630.

At 1620, the system obtains a status of an indicator that indicates whether a location of the base version on which the particular location depends has changed. The indicator may be stored in the data structure for the particular location. In some embodiments, the system determines whether the evaluated value (e.g., the result from the previous evaluation) is still valid, such as whether a value on which the formula depends (e.g., a value in the base version or another location of the scenario version) has changed.

In response to a value changing at a location in the base version, the system can propagate the change by setting an indicator that the base version has changed (at least for that location). The indicator may be stored in a data structure for the location of the hypercube.

At 1625, the system determines whether the status of the indicator indicates that the location(s) of the base version on which the particular location of the scenario version depends has changed. For example, the system determines whether the data structure indicates that the result from the previous evaluation is still valid. In response to determining that the status of the indicator indicates that the location of the base version (or other value on which the particular location of the scenario version depends) has changed, process 1600 proceeds to 1630. Conversely, in response to determining that the status of the indicator indicates that the location of the base version (or other value on which the particular location of the scenario version depends) has not changed, process 1600 proceeds to 1640.

At 1630, the system obtains the input values for the formula. For example, the system obtains the values on which the formula comprised in the particular location of the scenario version depends. In some embodiments, the input values may be values from other locations within the scenario version and/or values from one or more locations in the base version.

At 1635, the system evaluates the formula. The system determines a resulting value for the formula and stores the evaluation for use by subsequent reading processes during the validity period for such evaluation result.

At 1640, the system obtains the previously evaluated value.

At 1645, the system obtains a static value for the particular location. For example, the system obtains the input value stored at the particular location of the scenario version.

At 1650, the system provides the override value for the particular location.

At 1655, a determination is made as to whether process 1600 is complete. In some embodiments, process 1600 is determined to be complete in response to a determination that no further planning sessions are to be provided, no further override values are to be provided or evaluated, no further reading processes exist, the scenario version has been completely loaded/instantiated, a user has exited the system, an administrator indicates that process 1600 is to be paused or stopped, etc. In response to a determination that process 1600 is complete, process 1600 ends. In response to a determination that process 1600 is not complete, process 1600 returns to 1605.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
obtain a request to store a scenario version of a hypercube as a base version;
obtain a set of transactions corresponding to hypercube updates for the scenario version; and
write the set of transactions to the base version, wherein:
writing the set of transactions to the base version comprises, for at least one transaction corresponding to a particular location in the hypercube, using a data structure associated with the particular location that indicates whether one or more scenario versions override corresponding base version values at the particular location to detect and resolve a conflict between the transaction and a value at the particular location in the base version; and
the conflict is resolved based at least in part on a predefined conflict resolution rule; and a memory coupled to the one or more processors and configured to provide the one or more processors with instructions.

2. The system of claim 1, wherein the one or more processors are further configured to:
in response to writing the set of transactions to the base version, set one or more indicators to indicate that the base version has changed.

3. The system of claim 2, wherein the one or more indicators that are set to indicate that the base version has changed correspond to indicators for hypercube locations of the base version that have been updated.

4. The system of claim 2, wherein in response to the one or more indicators being set to indicate that the base version has changed, a corresponding set of changes to the base version is propagated to one or more scenario versions having a dependency on the base version.

5. The system of claim 4, wherein a particular scenario version has the dependency on the base version if at least one location of the particular scenario version depends on a value at a location of the base version.

6. The system of claim 4, wherein the one or more indicators are stored in a data structure that stores override data for the base version and the one or more scenario versions.

7. The system of claim 6, wherein the data structure indicates a set of scenario values that override corresponding base version values.

8. The system of claim 1, wherein a particular location of the hypercube has the associated data structure that stores override data with respect to the particular location of the base version and the particular location of one or more scenario versions.

9. The system of claim 8, wherein the data structure indicates whether the particular location of the base version is overridden for a particular scenario version.

10. The system of claim 9, wherein in response to determining that the data structure indicates that the particular location of the base version is not overridden for the particular scenario version, a base version value at the particular location is used as a scenario version value at the particular location for the particular scenario version.

11. The system of claim 1, wherein:
a plurality of scenario versions are defined;
a plurality of copies of the base version are instantiated by a plurality of compute resources; and
a compute resource instantiating a particular copy of the base version instantiates a subset of the plurality of scenario versions.

12. The system of claim 11, wherein the plurality of compute resources are virtual machines.

13. The system of claim 11, wherein:
a first set of compute resources instantiates a first base version;
a second set of compute resources instantiates a second base version; and
a change made to a value at a particular location in the first base version is propagated to the second base version.

14. The system of claim 1, wherein in response to the set of transactions being written to the base version, corresponding changes to locations in the base version are automatically propagated to one or more scenario versions having a dependency on the base version.

15. The system of claim 1, wherein:
a first location of a particular scenario version has a dependency on a particular location of the base version;

the first location of the particular scenario version comprises a formula that depends on the particular location of the base version; and in response to determining that writing the set of transactions to the base version comprises updating the particular location of the base version, setting an indicator to indicate that the formula is to be recomputed to obtain a value at the first location of the particular scenario version.

16. The system of claim 1, wherein updates to the base version associated with writing the set of transactions are not automatically propagated to a particular location of a particular scenario version if the particular location comprises a formula that is dependent on at least one location of the base version that is updated.

17. The system of claim 1, wherein the set of transactions are stored in a transaction log associated with the scenario version.

18. The system of claim 1, wherein:

version information for a particular location of the hypercube is stored in a data structure associated with the particular location; and the version information comprises a pointer to snapshot information for the particular location, and the snapshot information is associated with a corresponding validity period.

19. The system of claim 1, wherein resolving the conflict comprises automatically applying the transaction from the scenario version to overwrite the value at the particular location in the base version.

20. The system of claim 1, wherein resolving the conflict comprises automatically applying the transaction from the scenario version to overwrite the value at the particular location in the base version regardless of whether an edit to the particular location in the base version occurred before or after creation of the scenario version.

21. The system of claim 1, wherein resolving the conflict comprises prompting a user to select between the transaction from the scenario version and the value at the particular location in the base version.

22. The system of claim 1, wherein resolving the conflict comprises comparing a timestamp associated with the transaction from the scenario version and a timestamp associated with an edit to the particular location in the base version, and selecting a later edit.

23. The system of claim 1, wherein resolving the conflict comprises skipping application of the transaction from the scenario version in response to determining that an edit to the particular location in the base version is newer than the transaction.

24. The system of claim 1, wherein the one or more processors are further configured to select the predefined conflict resolution rule from a plurality of predefined conflict resolution rules prior to writing the set of transactions to the base version.

25. A method, comprising:

obtaining, by one or more processors, a request to store a scenario version of a hypercube as a base version;

obtaining a set of transactions corresponding to hypercube updates for the scenario version; and writing the set of transactions to the base version, wherein:

writing the set of transactions to the base version comprises, for at least one transaction corresponding to a particular location in the hypercube, using a data structure associated with the particular location that indicates whether one or more scenario versions override corresponding base version values at the particular location to detect and resolve a conflict between the transaction and a value at the particular location in the base version; and the conflict is resolved based at least in part on a predefined conflict resolution rule.

26. A computer program product embodied in a non-transitory computer readable medium and comprising computer instructions that, when executed by one or more processors, cause the one or more processors to perform operations comprising:

obtaining, by one or more processors, a request to store a scenario version of a hypercube as a base version;

obtaining a set of transactions corresponding to hypercube updates for the scenario version; and writing the set of transactions to the base version, wherein:

writing the set of transactions to the base version comprises, for at least one transaction corresponding to a particular location in the hypercube, using a data structure associated with the particular location that indicates whether one or more scenario versions override corresponding base version values at the particular location to detect and resolve a conflict between the transaction and a value at the particular location in the base version; and the conflict is resolved based at least in part on a predefined conflict resolution rule.

27. A system, comprising:

one or more processors configured to:

obtain a request to store a scenario version of a hypercube as a base version;

obtain a set of transactions corresponding to hypercube updates for the scenario version; and write the set of transactions to the base version, wherein:

a particular location of the hypercube has an associated data structure that stores override data with respect to the particular location of the base version and the particular location of one or more scenario versions;

the data structure indicates whether the particular location of the base version is overridden for a particular scenario version; and in response to determining that the data structure indicates that the particular location of the base version is not overridden for the particular scenario version, a base version value at the particular location is used as a scenario version value at the particular location for the particular scenario version; and a memory coupled to the one or more processors and configured to provide the one or more processors with instructions.

* * * * *